US012626052B2

(12) United States Patent
Lee et al.

(10) Patent No.: US 12,626,052 B2
(45) Date of Patent: May 12, 2026

(54) ELECTRONIC DEVICE AND METHOD FOR INPUTTING DATA INTO DATA ENTRY FIELD IN ELECTRONIC DEVICE

(71) Applicant: SAMSUNG ELECTRONICS CO., LTD., Suwon-si (KR)

(72) Inventors: Kangmin Lee, Suwon-si (KR); Eunhye Kim, Suwon-si (KR); Miseon Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 18/244,095

(22) Filed: Sep. 8, 2023

(65) Prior Publication Data

US 2023/0419022 A1     Dec. 28, 2023

Related U.S. Application Data

(63) Continuation of application No. PCT/KR2022/001217, filed on Jan. 24, 2022.

(30) Foreign Application Priority Data

Mar. 9, 2021     (KR) ........................ 10-2021-0030966

(51) Int. Cl.
*G06F 3/045* (2006.01)
*G06F 3/04817* (2022.01)
(Continued)

(52) U.S. Cl.
CPC ........ *G06F 40/174* (2020.01); *G06F 3/04817* (2013.01); *G06F 3/0484* (2013.01); *G06V 20/62* (2022.01); *G06V 2201/02* (2022.01)

(58) Field of Classification Search
CPC .. G06F 40/174; G06F 3/04817; G06F 3/0484; G06V 20/62; G06V 2201/02
See application file for complete search history.

(56) References Cited

U.S. PATENT DOCUMENTS

| | | | |
|---|---|---|---|
| 6,246,794 B1 | 6/2001 | Kagehiro et al. | |
| 9,038,886 B2 * | 5/2015 | Hammad ............... | G06Q 20/12 235/375 |

(Continued)

FOREIGN PATENT DOCUMENTS

| | | |
|---|---|---|
| KR | 10-2009-0052013 A | 5/2009 |
| KR | 10-2011-0131814 A | 12/2011 |

(Continued)

OTHER PUBLICATIONS

Li et al., Analysis of a Location-based Social Network, 2009, IEEE, 8 pages. (Year: 2029).*

(Continued)

*Primary Examiner* — Linh K Pham
(74) *Attorney, Agent, or Firm* — Sughrue Mion, PLLC

(57) ABSTRACT

An electronic device includes: a communication module; a display; a memory, at least one processor operatively connected to the communication module, the display, and the memory; and wherein the memory stores instructions configured to, when executed, cause the at least one processor to: display an application screen of an application on the display, identify a data input field on the application screen, identify a data type corresponding to the data input field, display at least one external electronic device capable of providing data corresponding to the identified data type, receive the data corresponding to the identified data type from the at least one external electronic device, and enter the received data into the data input field.

17 Claims, 17 Drawing Sheets

(51) Int. Cl.
    *G06F 3/0484*     (2022.01)
    *G06F 40/174*     (2020.01)
    *G06V 20/62*     (2022.01)

(56)         References Cited

U.S. PATENT DOCUMENTS

| | | | |
|---|---|---|---|
| 11,871,237 B1 * | 1/2024 | Han | H04W 92/10 |
| 2004/0198329 A1 * | 10/2004 | Vasa | H04M 3/4931 |
| | | | 455/418 |
| 2007/0133876 A1 * | 6/2007 | Chande | G06F 40/174 |
| | | | 382/181 |
| 2009/0191898 A1 * | 7/2009 | Lewis | H04W 4/02 |
| | | | 455/456.3 |
| 2010/0004005 A1 * | 1/2010 | Pereira | H04W 4/029 |
| | | | 455/457 |
| 2010/0261463 A1 * | 10/2010 | Collet | H04W 4/14 |
| | | | 455/414.1 |
| 2011/0131524 A1 | 6/2011 | Chang et al. | |
| 2011/0150336 A1 * | 6/2011 | Van | G06V 30/416 |
| | | | 382/182 |
| 2012/0136933 A1 * | 5/2012 | Choi | G06F 16/434 |
| | | | 709/204 |
| 2012/0302167 A1 * | 11/2012 | Yun | G06F 16/951 |
| | | | 345/169 |
| 2012/0324192 A1 * | 12/2012 | Tanabe | G06F 3/0647 |
| | | | 711/E12.002 |
| 2013/0044051 A1 | 2/2013 | Jeong | |
| 2014/0035851 A1 | 2/2014 | Kim et al. | |
| 2014/0074655 A1 * | 3/2014 | Lim | G06Q 20/3265 |
| | | | 705/26.1 |
| 2014/0080469 A1 | 3/2014 | Ko et al. | |
| 2014/0244455 A1 * | 8/2014 | Huang | G06T 7/00 |
| | | | 705/31 |
| 2014/0365944 A1 * | 12/2014 | Moore | G09B 29/003 |
| | | | 715/772 |
| 2015/0007066 A1 | 1/2015 | Joo et al. | |
| 2015/0106175 A1 * | 4/2015 | Kang | H04W 4/80 |
| | | | 705/14.4 |
| 2016/0165029 A1 * | 6/2016 | Jegal | G06F 3/0482 |
| | | | 715/811 |
| 2016/0300573 A1 * | 10/2016 | Carbune | G10L 17/22 |
| 2016/0316354 A1 * | 10/2016 | Matsumura | H04W 40/22 |
| 2017/0004475 A1 * | 1/2017 | White | G06Q 20/322 |
| 2017/0085706 A1 | 3/2017 | Kim et al. | |
| 2017/0277499 A1 * | 9/2017 | Liang | G06F 3/1423 |
| 2017/0322920 A1 * | 11/2017 | Meschkat | G06Q 30/0641 |
| 2018/0165468 A1 | 6/2018 | Moon et al. | |
| 2018/0189972 A1 * | 7/2018 | Humbert | H04W 4/02 |
| 2019/0373469 A1 * | 12/2019 | Bradley | H04L 67/51 |
| 2020/0053521 A1 * | 2/2020 | Kim | H04L 65/1016 |
| 2020/0201495 A1 * | 6/2020 | Coffman | H04N 21/42203 |
| 2021/0038998 A1 * | 2/2021 | Tallarico | A63F 13/214 |
| 2021/0056552 A1 * | 2/2021 | Murray | G06Q 20/3274 |
| 2021/0250744 A1 * | 8/2021 | Kang | H04W 76/14 |
| 2021/0397390 A1 * | 12/2021 | Li | G06F 3/126 |

FOREIGN PATENT DOCUMENTS

| | | | | |
|---|---|---|---|---|
| KR | 10-2013-0020366 A | 2/2013 | | |
| KR | 10-2014-0001583 A | 1/2014 | | |
| KR | 20140001583 A * | 1/2014 | | G06Q 50/10 |
| KR | 10-2014-0016699 A | 2/2014 | | |
| KR | 10-2014-0032768 A | 3/2014 | | |
| KR | 10-2015-0082775 A | 7/2015 | | |
| KR | 10-2015-0113390 A | 10/2015 | | |
| KR | 10-1643002 B1 | 7/2016 | | |
| KR | 10-2017-0034229 A | 3/2017 | | |
| KR | 101804194 B1 * | 12/2017 | | H04W 4/12 |
| KR | 102092332 B1 * | 4/2020 | | G06F 3/1423 |

OTHER PUBLICATIONS

Arb et al., VENETA: Serverless Friend-of-Friend Detection in Mobile Social Networking, 2008, IEEE, 6 pages (Year: 2008).*

Wang et al., Wi-friend: Identifying potential real life friends nearby, 2017, IEEE, 9 pages (Year: 2017).*

Authors et al., System and Method for Analysing Data Records Utilizing a Touch Screen Interface, Jan. 24, 2011, IP.com, 34 pages (Year: 2011).*

Written Opinion (PCT/ISA/237) issued May 6, 2022 from the International Searching Authority in International Application No. PCT/KR2022/001217.

International Search Report (PCT/ISA/210) issued May 6, 2022 from the International Searching Authority in International Application No. PCT/KR2022/001217.

Communication issued on Jul. 5, 2024 by the European Patent Office for European Patent Application No. 22767319.1.

Communication dated Oct. 13, 2025 issued by the Korean Intellectual Property Office in Korean Patent Application No. 10-2021-0030966.

* cited by examiner

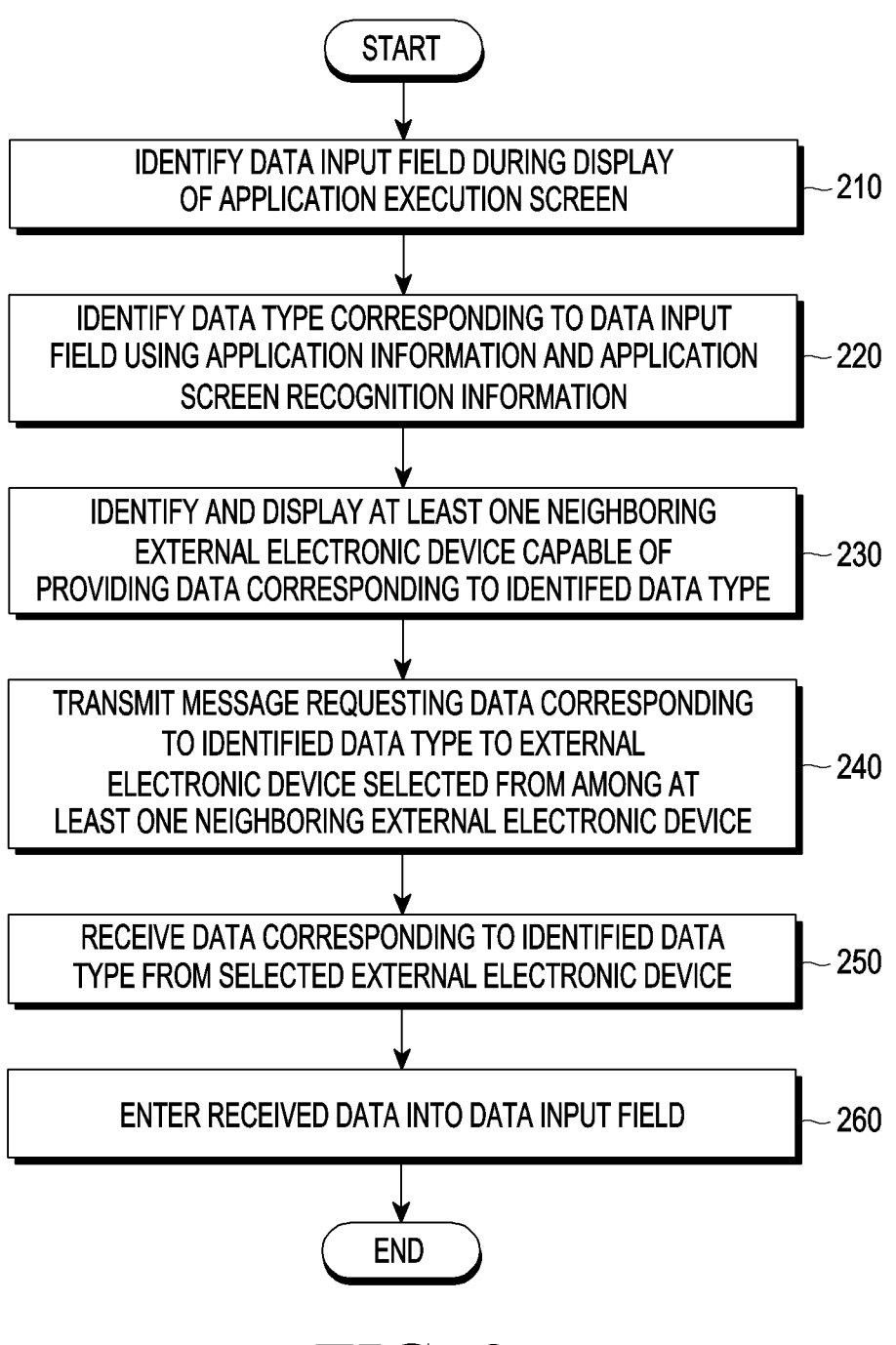

START

IDENTIFY DATA INPUT FIELD DURING DISPLAY OF APPLICATION EXECUTION SCREEN ~210

IDENTIFY DATA TYPE CORRESPONDING TO DATA INPUT FIELD USING APPLICATION INFORMATION AND APPLICATION SCREEN RECOGNITION INFORMATION ~220

IDENTIFY AND DISPLAY AT LEAST ONE NEIGHBORING EXTERNAL ELECTRONIC DEVICE CAPABLE OF PROVIDING DATA CORRESPONDING TO IDENTIFED DATA TYPE ~230

TRANSMIT MESSAGE REQUESTING DATA CORRESPONDING TO IDENTIFIED DATA TYPE TO EXTERNAL ELECTRONIC DEVICE SELECTED FROM AMONG AT LEAST ONE NEIGHBORING EXTERNAL ELECTRONIC DEVICE ~240

RECEIVE DATA CORRESPONDING TO IDENTIFIED DATA TYPE FROM SELECTED EXTERNAL ELECTRONIC DEVICE ~250

ENTER RECEIVED DATA INTO DATA INPUT FIELD ~260

END

ELECTRONIC DEVICE AND METHOD FOR INPUTTING DATA INTO DATA ENTRY FIELD IN ELECTRONIC DEVICE

CROSS-REFERENCE TO RELATED APPLICATIONS

This application is a by-pass continuation application of International Application No. PCT/KR2022/001217, filed on Jan. 24, 2022, which is based on and claims priority to Korean Patent Application No. 10-2021-0030966, filed on Mar. 9, 2021, in the Korean Intellectual Property Office, the disclosures of which are incorporated by reference herein their entireties.

BACKGROUND

1. Field

The disclosure relates to an electronic device and a method of entering data into a data input field in the electronic device.

2. Description of Related Art

The use of portable electronic devices (such as smartphones, tablet PCs, or wearable devices) has recently been increasing, and a user may enter data into a data input field in an electronic device by various input means. For example, the electronic device may execute various applications and enter data into various data input fields on application screens.

It may be necessary to enter various types of data into a data input field during execution of an application in an electronic device. For example, another person's information or data related to another person (e.g., another person's e-mail address, identifier (ID), account, account number, address, phone number, and/or account information) may need to be entered into the data input field. Although a user may enter data corresponding to another person's information into the data input field, directly or by search, the user may need to directly ask the other person for the information, and then, memorize or write down the information before entering information into the data input field, which may cause inconvenience.

SUMMARY

Provided are an electronic device having an application screen (user interface) that enables convenient input of data and a method performed by the electronic data thereof.

According to one aspect of the disclosure, an electronic device includes: a communication module; a display; a memory, at least one processor operatively connected to the communication module, the display, and the memory; and wherein the memory stores instructions configured to, when executed, cause the at least one processor to: display an application screen of an application on the display, identify a data input field on the application screen, identify a data type corresponding to the data input field, display at least one external electronic device capable of providing data corresponding to the identified data type, receive the data corresponding to the identified data type from the at least one external electronic device, and enter the received data into the data input field.

According to another aspect of the disclosure, an electronic device includes; a short-range communication module; a display; a memory; at least one processor operatively connected to the short-range communication module, the display, and the memory; and wherein the memory stores instructions configured to, when executed, cause the at least one processor to: receive a message requesting a confirmation of capability of providing data corresponding to a data type corresponding to a data input field of an application running in an external electronic device from the external electronic device through the short-range communication module, based on the data type, transmit a message of the confirmation of capability of providing the data to the external electronic device through the short-range communication module, and receive, from the external electronic device, a message requesting the data and transmit, to the external electronic device, data.

According to another aspect of the disclosure, a method of entering data into a data input field in an electronic device, the method includes: displaying an application screen of an application on a display; identifying a data input field on the application screen; identifying a data type corresponding to the data input field; displaying at least one external electronic device capable of providing data corresponding to the identified data type; receiving the data corresponding to the identified data type from the at least one external electronic device through a communication module; and entering the received data into the data input field.

According to another aspect of the disclosure, a non-volatile storage medium storing instructions configured to, when executed by at least one processor, cause the at least one processor to perform at least one operation, wherein the at least one operation includes: displaying an application screen of an application on a display; identifying a data input field on the application screen; identifying a data type corresponding to the data input field; displaying at least one external electronic device capable of providing data corresponding to the identified data type; receiving the data corresponding to the identified data type from the at least one external electronic device; and entering the received data into the data input field.

According to one or more embodiments, data to be entered into a data input field is received from an external electronic device and automatically entered into the data input field during execution of an application. Accordingly, even when a user has no knowledge of data to be entered or has difficulty in searching for the data, the data may be entered.

According to one or more embodiments, a recipient email address to be entered into a recipient data input field is received from an external electronic device and automatically entered into the recipient data input field during execution of an email application. Accordingly, even when a user has no knowledge of the email address or has difficulty in searching for the email address, the email address may be entered.

According to one or more embodiments, a friend ID to be entered into a friend data input field is received from an external electronic device and automatically entered into the friend data input field during execution of a service application. Accordingly, even when a user has no knowledge of the friend ID or has difficulty in searching for the friend ID, the friend ID may be entered.

The effects achievable in the disclosure are not limited to the above-described effects, and other unmentioned effects will be understood by those skilled in the art from the following description.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a flowchart illustrating a method of entering data into a data input field in an electronic device according to an embodiment;

In relation to the description of the drawings, the same or similar reference numerals may be used for the same or similar components.

DETAILED DESCRIPTION

The terms as used in the disclosure are provided to merely describe specific embodiments, not intended to limit the scope of other embodiments. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

Figure 1:
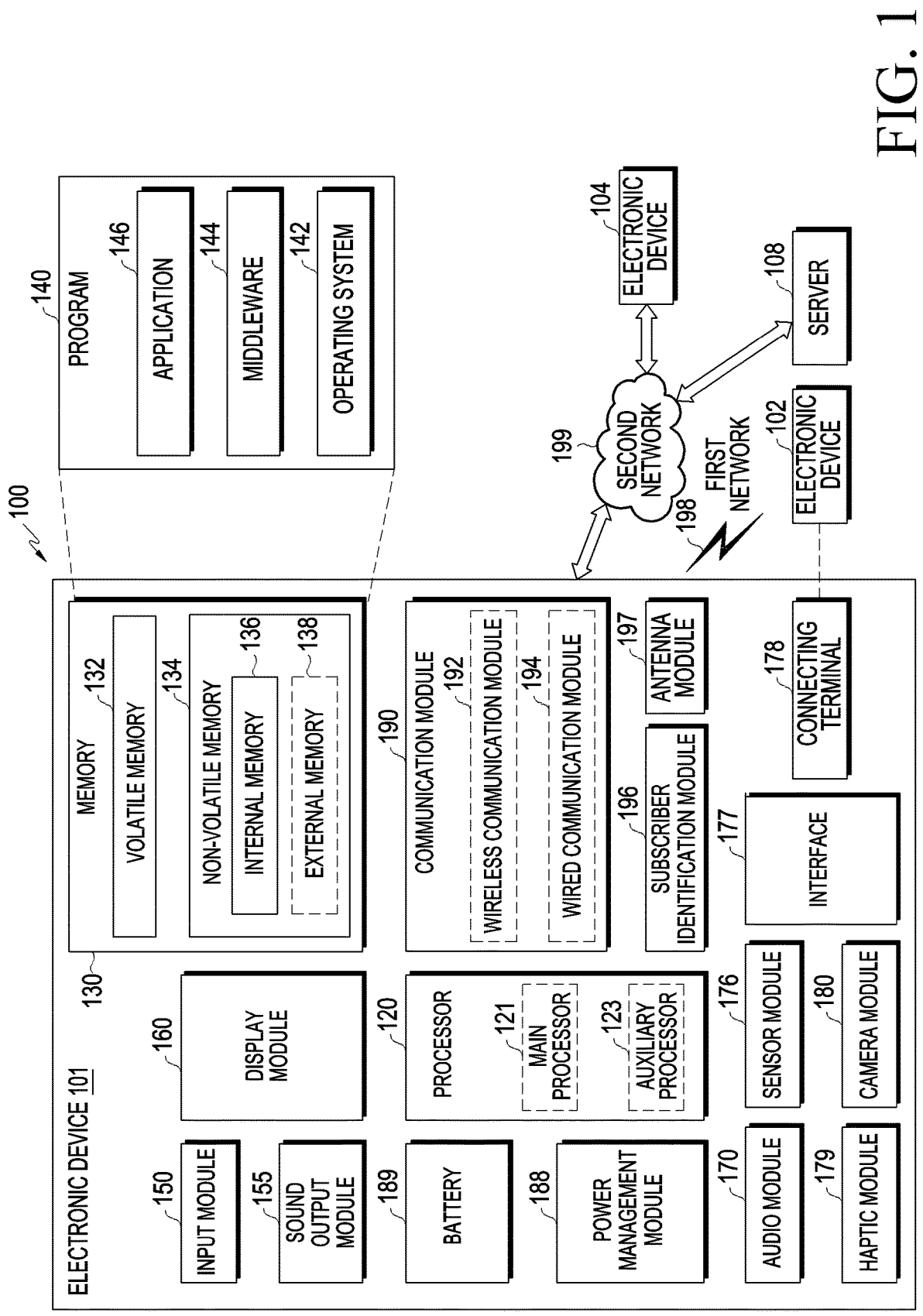
FIG. 1 is a block diagram illustrating an electronic device in a network environment according to an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a recipient. The speaker may be used for general purposes, such as playing multimedia or playing record. The recipient may be used for receiving incoming calls. According to an embodiment, the recipient may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the (external) electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the (external) electronic device 104 may include an internet-of-things (IoT) device. The server 108 may be an intelligent server using machine learning and/or a neural network. According to an embodiment, the (external) electronic device 104 or the server 108 may be included in the second network 199. The electronic device 101 may be applied to intelligent services (e.g., smart home, smart city, smart car, or healthcare) based on 5G communication technology or IoT-related technology.

The electronic device 101 according to one or more embodiments of the disclosure may include at least one of, for example, a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, or a wearable device. The wearable device may include at least one of an accessory type (e.g. a watch, a ring, a bracelet, an anklet, a necklace, eyeglasses, contact lens, or a head-mounted-device (HMD)), a textile or clothing type (e.g. electronic clothes), a body-attached type (e.g., a skin pad or a tattoo), or a bio-implanted circuit. In some embodiments, the electronic device 101 may include at least one of, for example, a television, a digital video disk (DVD) player, an audio device, a refrigerator, an air conditioner, a vacuum cleaner, an oven, a microwave oven, a washing machine, an air purifier, a set top box, a home automation control panel, a security control panel, a media box (e.g. Samsung HomeSync™, Apple TV™, or Google TV™), a game console (e.g., Xbox™ or PlayStation™), an electronic dictionary, an electronic key, a camcorder, or an electronic picture frame.

In another embodiment, the electronic device 101 may include at least one of a variety of medical devices (e.g., various portable medical measuring devices (a blood glucose meter, a heart rate monitor, a blood pressure monitor, or a body temperature monitor), a magnetic resonance angiography (MRA), a magnetic resonance imaging (MRI), a computed tomography (CT), camera, or an ultrasonic device), a navigation device, a global navigation satellite system (GNSS), an event data recorder (EDR), a flight data recorder (FDR), an automotive infotainment device, marine electronic equipment (e.g., a marine navigation system, a gyrocompass, and so on), avionics, a security device, a vehicle head unit, an industrial or household robot, a drone, an ATM in a financial institution, a point of sales (POS) in a shop, or an IoT device (e.g., a light bulb, various sensors, a sprinkler device, a fire alarm, a thermostat, a street light, a toaster, exercise equipment, a hot water tank, a heaters, or a boiler). According to a certain embodiment, the electronic device 101 may include at least one of furniture, a part of a building/structure or an automobile, an electronic board, an electronic signature receiving device, a projector, or various measuring devices (e.g., a water, electricity, gas, or radio wave measuring device). In one or more embodiments, the electronic device may be flexible or a combination of two or more of the above various devices. An electronic device according to an embodiment of the disclosure is not limited to the above. In the disclosure, the term user may refer to a person using an electronic device or a device (e.g., an artificial intelligence electronic device) using an electronic device.

According to one or more embodiments, the electronic device 101 may include the communication module 190, the display module 160, the at least one processor 120 operatively connected to the display, and the memory 130. The memory may store instructions configured to, when executed, cause the at least one processor to display an application screen of a running application on the display, identify a data input field included in the application screen, identify a data type corresponding to the data input field, display at least one neighboring external electronic device capable of providing data corresponding to the identified data type, receive data corresponding to the identified data type from an external electronic device selected from among the at least one external electronic device, and enter the received data into the data input field.

According to one or more embodiments, the instructions may be configured to cause the at least one processor to display a neighbor search icon on the display, search for the at least one neighboring external electronic device through the communication module, when the neighbor search icon is selected, and identify whether the at least one neighboring external electronic device is capable of providing data corresponding to the identified data type as a result of the search.

According to one or more embodiments, the communication module may include a short-range communication module, and the instructions may be configured to cause the at least one processor to identify the at least one external electronic device around to the electronic device by scanning through the short-range communication module, transmit a message requesting confirmation of capability of providing data corresponding to the identified data type to each of the at least one external electronic device through the short-range communication module, receive a response to the message requesting confirmation of capability of providing data from each of the at least one external electronic device, and display information about an external electronic device capable of providing data among the at least one external electronic device based on the received response.

According to one or more embodiments, the electronic device may further include a gyro sensor, the short-range communication module may include a UWB communication module, and the instructions may be configured to cause the at least one processor to obtain information about a magnetic north direction being an absolute azimuth through the gyro sensor, obtain direction information (an angle of arrival (AOA)) about each of the at least one external electronic device through the UWB communication module, and identify an external electronic device in a specified direction with respect to the electronic device based on a difference between the information about the magnetic north direction and the direction information (AOA) about each of the at least one external electronic device.

According to one or more embodiments, the electronic device may further include a camera module, and the instructions may be configured to cause the at least one processor to identify an external electronic device in an image captured using the camera module among the at least one external electronic device based on the difference between the information about the magnetic north direction and the direction information (AOA) about each of the at least one external electronic device and the image.

According to one or more embodiments, information about the application may include at least one of an application type, a data input field type of the application, or a data input field hint of the application.

According to one or more embodiments, the instructions may be configured to cause the at least one processor to identify the data type corresponding to the data input field using at least one of information about the application or screen recognition information about the application screen, and when the screen recognition information is used, obtain the screen recognition information by performing screen recognition on the application screen.

According to one or more embodiments, the screen recognition may include text recognition, and the screen recognition information includes at least one of a screen title included in the application screen or a data input field title included in the application screen.

According to one or more embodiments, the instructions may be configured to cause the at least one processor to, when the data input field is activated or selected, display a key input window for entering data into the data input field, together with the neighbor search icon, on the display.

According to one or more embodiments, the instructions may be configured to cause the at least one processor to display the received data in an input area of the key input window and enter the received data displayed in the input area into the data input field.

According to one or more embodiments, the data type corresponding to the data input field includes at least one of an email account, an email address, an application account, an application ID, an SNS account, an SNS ID, a phone number, or an account number.

FIG. 2 is a flowchart illustrating an operation of entering data into a data input field in an electronic device according to an embodiment.

Referring to FIG. 2, the processor 120 of the electronic device 101 according to an embodiment may perform at least one of operations 210 to 260.

In operation 210, the processor 120 according to an embodiment may identify a data input field, while displaying an application execution screen. For example, the application may be one of various service applications. The various service applications may include a mail application, a game application, a social network service (SNS) application, a money transfer application, a messaging application, and/or a contact application, and any other application including a data input field requiring data input is available.

In operation 220, the processor 120 according to an embodiment may identify a data type corresponding to the data input field by using information about the running application and screen recognition information about the screen of the running application. For example, the inforusing the type (or name) of the running application, the data input field type of the running application, and/or the data input field hint of the running application, and the screen title included in the screen of the running application and/or the data input field title. For example, the data type corresponding to the data input field may include an email account (or email address), an application account (or application ID), an SNS account (or SNS ID), a phone number, or/and an account number.

For example, data types corresponding to context information (application information and application screen recognition information) may be identified as listed in Table 1 below.

TABLE 1

| Application information | | | Application screen recognition information | | |
|---|---|---|---|---|---|
| Application type (or name) | Data input field type | Data input field hint | Screen title | Data input field title | Data type |
| MAIL | email | Recipient | Write mail | Recipient | Email account (or email address) |
| GAME 1 | Text | Enter a user name to search for | Find friends | Search for user | GAME 1 account (or GAME 1 ID) |
| SNS 1 | text | Friend name | Add as contact | — | SNS 1 account(or SNS 1 ID) |
| SNS 2 | text | Friend name, account | — | — | SNS 2 account(or SNS 2 ID) |
| SMS | number | Recipient | New text message | — | Phone number |
| Money transfer service | number | Account number | Enter recipient | Enter account number | Account number | mation about the running application and the screen recognition information about the screen of the running application may be context information. The context information may include other context information (e.g., data input field information input by a user or sensing information obtained by the sensor module 176) related to data to be entered into the data input field in addition to the information about the running application and the screen recognition information about the screen of the running application.

The information about the running application according to an embodiment may be information included in an application program stored in the memory 130, and include the type (or name) of the running application (e.g., a mail application, an SNS application, a contact application, a money transfer application, or a game application), a data input field type (e.g. a text type, a number type, an account type, or any other type (e.g. an image type)) of the running application, and/or a data input field hint (e.g. a description of data required for a text input field) of the running application. The application screen recognition information according to an embodiment may include text information (e.g., a screen title, a data input field title, and/or other text included in an application screen) included in an application screen obtained through screen recognition (e.g., text recognition on the application screen) of the running application. The processor 120 according to an embodiment may identify the data type corresponding to the data input field by Referring to Table 1, when the type (or name) of the running application is "mail", the data input field type of the running application is "email", the running data input field hint is "recipient", the screen title included in the application screen is "write mail", and the title of the data input field included in the application screen is "recipient", the processor 120 according to an embodiment may identify the data type corresponding to the data input field as an e-mail account (or email address). When the running application is "GAME 1", the data input field type of the running application is "text", the running data input field hint is "Enter a user name to search for", and the screen title included in the application screen is "Find friends", and the title of the data input field included in the application screen is "Search for user", the processor 120 according to an embodiment may identify the data type corresponding to the data input field as GAME 1 account (or GAME 1 ID). Like "MAIL" or "GAME 1", the processor 120 according to an embodiment may identify a data type corresponding to the data input field for each of applications, "SNS 1", "SNS 2", "SMS", or "money transfer service". According to an embodiment, the processor 120 may control to display a key input window (or a keypad or a soft keypad) for data input of the identified data type on the display module 160. According to an embodiment, the processor 120 may display a neighbor search icon to request data corresponding to the identified data type from the outside, together with or separately from the key input window.

In operation 230, the processor 120 according to an embodiment may identify and display at least one external electronic device capable of providing data corresponding to the identified data type among at least one neighboring external electronic device. According to an embodiment, the processor 120 may identify whether the neighbor search icon displayed together with or separately from the key input window for data input of the identified data type has been selected. When the neighbor search icon has been selected, the processor 120 may detect at least one neighboring external electronic device through short-range wireless communication (e.g., Bluetooth communication, Bluetooth low energy (BLE) communication, ultra wide band (UWB) communication, and/or WiFi communication) using the communication module 190. The processor 120 may identify and display at least one external electronic device capable of providing data corresponding to the identified data type (e.g., email account (or email address), application account (or application ID), SNS account (or SNS ID), phone number, or account number) among the at least one detected external electronic device. According to an embodiment, when identifying the data input field while displaying the application execution screen, the processor 120 may identify at least one external electronic device using the communication module 190 (e.g., a short-range wireless communication module), the sensor module 176 (e.g., a gyro sensor), and/or the camera module 180. For example, the processor 120 may identify at least one neighboring external electronic device by performing a scan operation through the short-range wireless communication module. For example, when using a Wi-Fi communication module, the processor 120 may receive at least one beacon message by performing a scan operation based on a Wi-Fi communication protocol through the Wi-Fi communication module, and identify at least one neighboring external electronic device based on the at least one beacon message. For example, when using a Bluetooth legacy communication module or a BLE communication module, the processor 120 may perform a scan operation based on a Bluetooth communication protocol through the Bluetooth legacy communication module or the BLE communication module, and identify at least one neighboring external electronic device based on a scan result. For example, when using a UWB communication module, the processor 120 may perform a scan operation based on a UWB communication protocol through the UWB communication module, and identify at least one neighboring external electronic device based on a scan result. In addition, the processor 120 may obtain distance information (e.g., ranging information) between the electronic device 101 and each of the at least one external electronic device by calculating a time taken for transmitting and receiving UWB signals (e.g., a ranging request message and a ranging response message) between the electronic device 101 and each of the at least one external electronic device through the UWB communication module. In addition, the processor 120 may receive a ranging response signal from a first external electronic device (e.g., one of the at least one external electronic device) via a plurality of antennas through the UWB communication module in response to a ranging request message, and obtain direction information (e.g., an arrival of angle (AOA)) about the first external electronic device by using a reception time difference between ranging response signals received at the plurality of antennas. In this manner, the processor 120 may obtain direction information about each of the at least one (external) electronic device 104.

The processor 120 according to an embodiment may further use the sensor module 176 (e.g., the gyro sensor) in addition to the short-range communication module to identify at least one external electronic device. For example, the processor 120 may obtain information about a magnetic north direction being an absolute direction through the gyro sensor, identify a direction in which each of the at least one external electronic device is located with respect to the electronic device 101 based on the direction information about each of the at least one external electronic device as a relative direction obtained through UWB communication, and identify an external electronic device in a specified direction among the at least one external electronic device.

The processor 120 according to an embodiment may further use the camera module 180 in addition to the short-range communication module and the sensor module 176 (e.g., the gyro sensor) to identify at least one neighboring external electronic device. For example, the processor 120 may identify an external electronic device neighboring to the electronic device 101 and being captured by the camera module 180 among the at least one external electronic device based on the direction of each of the at least one external electronic device with respect to the electronic device 101, obtained by using the gyro sensor and the UWB communication module, and a capturing direction of the camera module 180.

The processor 120 according to an embodiment may display information about at least one external electronic device capable of providing data corresponding to the identified data type (e.g., an email account (or email address), an application account (or application ID), an SNS account (or an SNS ID), a phone number, or an account number) among the at least one identified neighboring external electronic device through the display module 160. For example, the processor 120 may display user profile information about the at least one external electronic device capable of providing data corresponding to the identified data type. The user profile information may include a user picture, a user name, a user nickname, or/and a user ID. According to an embodiment, the user profile information may be displayed such that user profile information obtained through a neighbor search icon is distinguished from user profile information obtained through proximity sensing. According to an embodiment, the user profile information may be displayed such that user profile information about a closest user to user profile information about a farthest user are identified according to proximity degrees between the electronic device 101 and the at least one external electronic device.

In operation 240, the processor 120 according to an embodiment may transmit a message requesting data corresponding to the identified data type to the external electronic device selected from among the at least one external electronic device. The processor 120 according to an embodiment may receive an input for selecting one of user profiles of the at least one external electronic device displayed on the display module 160. The processor 120 may transmit the message requesting data corresponding to the identified data type to an external electronic device corresponding to the selected user profile.

In operation 250, the processor 120 according to an embodiment may receive data corresponding to the identified data type from the selected external electronic device in response the message requesting data corresponding to the identified data type.

In operation 260, the processor 120 according to an embodiment may enter the received data into the data input field.

According to an embodiment, although it has been described with reference to FIG. 2 that the electronic device 101 identifies a data type to be received based on information about a running application and screen recognition information about a screen of the running application, the electronic device 101 may transmit context information to the (external) electronic device 104, and the external electronic device may identify a data type to be transmitted and provide data corresponding to the identified data type.

According to one or more embodiments, a method of entering data into a data input field in the electronic device 101 may include displaying an application screen of a running application on the display module 160, identifying a data input field included in the application screen, identifying a data type corresponding to the data input field, displaying at least one neighboring external electronic device capable of providing data corresponding to the identified data type, receiving data corresponding to the identified data type from an external electronic device selected from among the at least one external electronic device through the communication module 190, and entering the received data into the data input field.

According to one or more embodiments, the method may further include displaying a neighbor search icon on the display, when the neighbor search icon is selected, searching for the at least one neighboring external electronic device through the communication module, and identifying whether the at least one neighboring external electronic device is capable of providing data corresponding to the identified data type as a result of the search.

According to one or more embodiments, the method may further include identifying the at least one external electronic device around the electronic device by scanning through a short-range communication module, transmitting a message requesting confirmation of capability of providing data corresponding to the identified data type to each of the at least one external electronic device through the short-range communication module, receiving a response to the message requesting confirmation of capability of providing data from each of the at least one external electronic device, and displaying information about an external electronic device capable of providing data among the at least one external electronic device based on the received response.

According to one or more embodiments, the method may further include obtaining information about a magnetic north direction being an absolute azimuth through a gyro sensor, obtaining direction information (AOA) about each of the at least one external electronic device through a UWB communication module, and identifying an external electronic device in a specified direction with respect to the electronic device based on a difference between the information about the magnetic north direction and the direction information (AOA) about each of the at least one external electronic device.

According to one or more embodiments, the method may further include identifying an external electronic device in an image captured using the camera module among the at least one external electronic device based on the difference between the information about the magnetic north direction and the direction information (AOA) about each of the at least one external electronic device and the image.

According to one or more embodiments, information about the application may include at least one of an application type (or name), a data input field type of the application, or a data input field hint of the application.

According to one or more embodiments, the method may further include identifying the data type corresponding to the data input field using at least one of information about the application or screen recognition information about the application screen, and further include, when the screen recognition information is used, obtaining the screen recognition information by performing screen recognition on the application screen.

According to one or more embodiments, the screen recognition may include text recognition, and the screen recognition information may include at least one of a screen title included in the application screen or a data input field title included in the application screen.

According to one or more embodiments, the method may further include, when the data input field is activated or selected, displaying a key input window for entering data into the data input field, together with the neighbor search icon, on the display.

According to one or more embodiments, the method may further include displaying the received data in an input area of the key input window, and entering the received data displayed in the input area into the data input field.

According to one or more embodiments, the data type corresponding to the data input field may include at least one of an email account, an email address, an application account, an application ID, an SNS account, an SNS ID, a phone number, or an account number.

FIGS. 3A to 3D are diagrams illustrating examples of a data input field on a screen of a running application according to an embodiment.

Figures 3A, 3B:
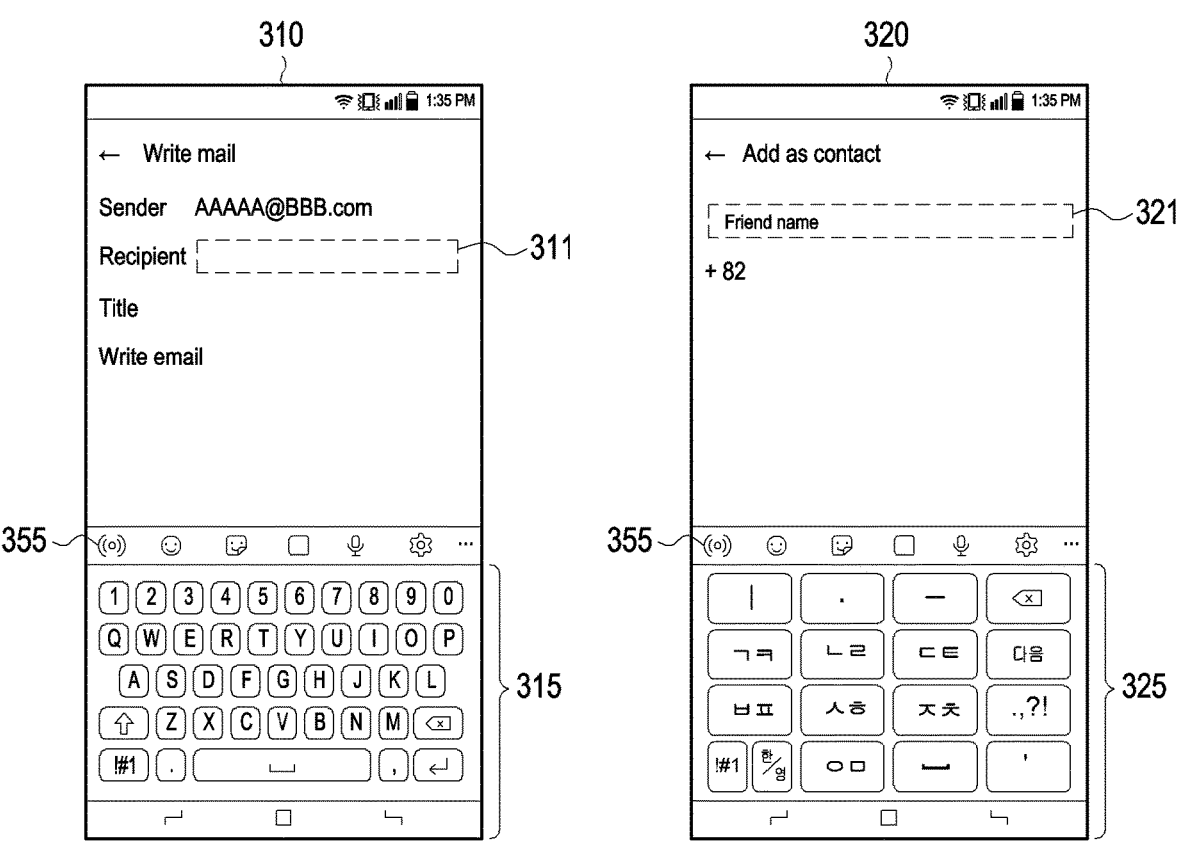
FIGS. 3A to 3D are diagrams illustrating exemplary data input fields on screens of running applications according to an embodiment.

FIG. 3A is a diagram illustrating an exemplary data input field on a mail application screen according to an embodiment.

Referring to FIG. 3A, the processor 120 according to an embodiment may identify a recipient data input field 311 on a screen 310 of a running mail application. For example, when the recipient data input field 311 is activated on the screen 310 of the running mail application or selected by the user, the processor 120 may identify the recipient data input field 311 and display a key input window (or a keypad or a soft keypad) 315 for input of an email account or email ID in the recipient data input field 311. For example, the processor 120 may display a neighbor search icon 355 together with or separately from the key input window 315.

FIG. 3B is a diagram illustrating an exemplary data input field on a contact application screen according to an embodiment.

Referring to FIG. 3B, the processor 120 according to an embodiment may identify a friend name data input field 321 on a screen 320 of a running contact application. For example, when the friend name data input field 321 is activated on the contact application screen 320 or selected by the user, the processor 120 may identify the friend name data input field 321 and display a key input window (or keypad or soft keypad) 325 for input of a friend name in the friend name data input field 321. For example, the processor 120 may display the neighbor search icon 355 together with or separately from the key input window 325.

Figures 3C, 3D:
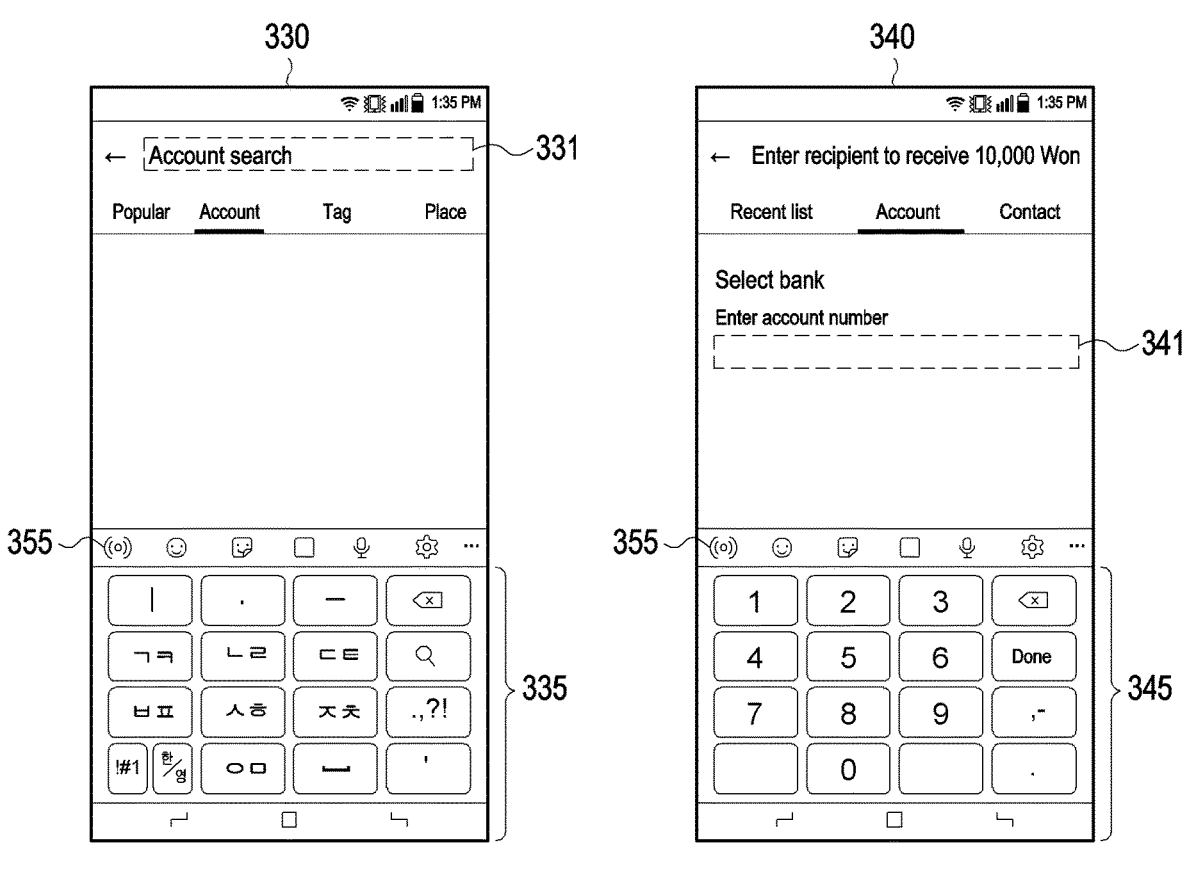

FIG. 3C is a diagram illustrating an exemplary data input field on an SNS application screen according to an embodiment.

Referring to FIG. 3C, the processor 120 according to an embodiment may identify an account search data input field 331 on a screen 330 of a running SNS application. For example, when the account search data input field 331 is activated on the screen 330 of the running SNS application or selected by the user, the processor 120 may identify the account search data input field 331 and display a key input window (or keypad or soft keypad) 335 for input of an account to search for in the account search data input field 331. For example, the processor 120 may display the neighbor search icon 355 together with or separately from the key input window 335.

FIG. 3D is a diagram illustrating an exemplary data input field on a money transfer application screen according to an embodiment.

Referring to FIG. 3D, the processor 120 according to an embodiment may identify an account number data input field 341 on a screen 340 of a running money transfer application. For example, when the account number data input field 341 is activated on the money transfer application screen 340 or selected by the user, the processor 120 may identify the account number data input field 341 and display a key input window (or keypad or soft keypad) 345 for input of an account number in the account number data input field 341. For example, the processor 120 may display the neighbor search icon 355 together with or separately from the key input window 345.

Referring to FIGS. 3A to 3D, when displaying the key input window 315, 325, 335, or 345, the processor 120 according to an embodiment may identify a data type corresponding to a data input field using information about a running application and screen recognition information about the running application, and receive data corresponding to the identified data type from a neighboring external electronic device through the neighbor search icon 355 displayed together with or separately from the key input window 315, 325, 335, or 345. According to another embodiment, when displaying the key input window 315, 325, 335, or 345, the processor 120 may receive data corresponding to the identified data type from a neighboring external electronic device identified by using the communication module (e.g., the short-range wireless communication module) or the sensor module 176 (e.g., the gyro sensor), without displaying the neighbor search icon 355.

Figure 4A:
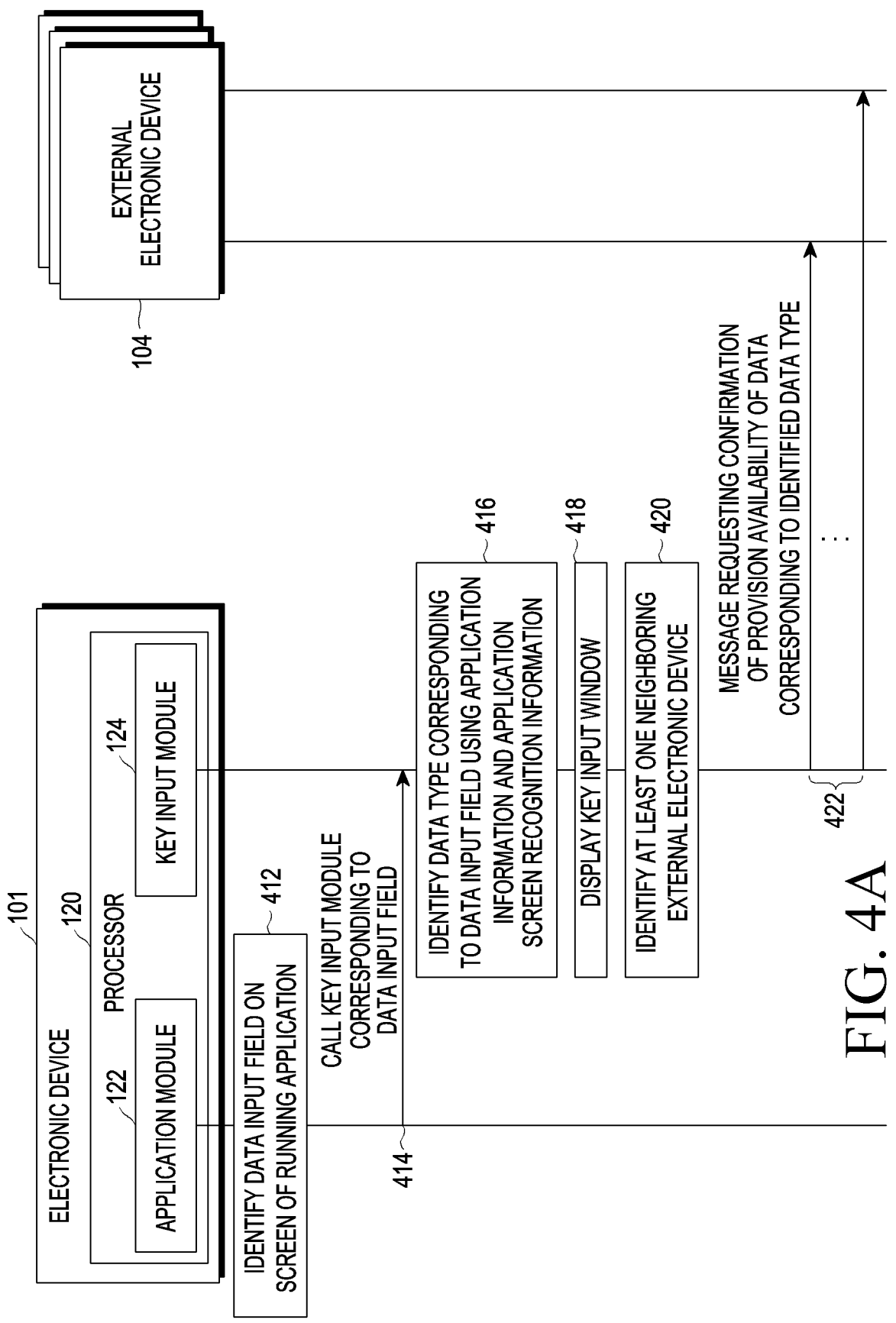
FIGS. 4A and 4B are diagrams illustrating operations of an application module and a key input module included in a processor of an electronic device and an operation of an external electronic device according to an embodiment.
Figure 4B:
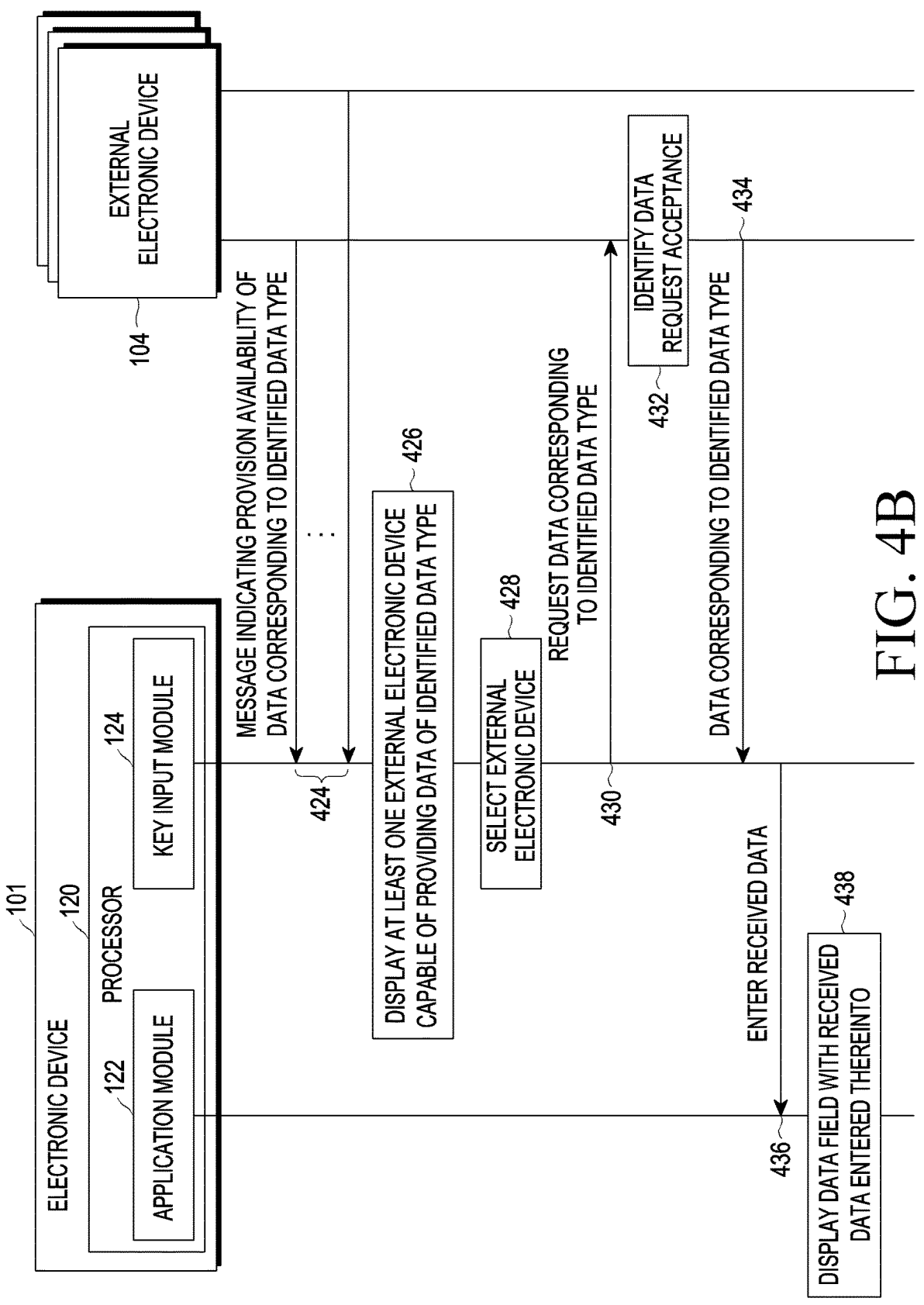

FIGS. 4A and 4B are diagrams illustrating operations of an application module and a key input module included in a processor of an electronic device, and an operation of an external electronic device according to an embodiment.

Referring to FIGS. 4A and 4B, the processor 120 of the electronic device 101 according to an embodiment may perform operations of an application module 122 and a key input module 124. For example, the application module 122 and the key input module 124 may be software modules executed by the processor 120. Alternatively, the application module 122 and the key input module 124 may be hardware modules included in or independent of the processor 120.

In operation 412, the application module 122 according to an embodiment may identify a data input field during display of an application execution screen. For example, the application module 122 may identify the data input field on the application execution screen during display of the application execution screen on the display module 160.

In operation 414, the application module 122 according to an embodiment may call the key input module 124 corresponding to the data input field. For example, when the data input field is activated or when the data input field is selected by the user, the application module 122 may call the key input module 124 for data input.

In operation 416, the key input module 124 according to an embodiment may identify a data type corresponding to the data input field by using application information and application screen recognition information. The application information according to an embodiment may be information included in an application program stored in the memory 130, and include the type (or name) (e.g., a mail application, an SNS application, a contact application, a money transfer application, or a game application) of a running application, a data input field type (e.g. a text type, a number type, an account type, or any other type (e.g. image type)) of the running application, and/or a data input field hint (e.g. a description of data required for a text input field) of the running application. The application screen recognition information according to an embodiment may include text information (e.g., a screen title, a data input field title, and/or other text included in an application screen) included in an application screen obtained through screen recognition (e.g., text recognition on the application screen) of the running application. The key input module 124 according to an embodiment may identify the data type corresponding to the data input field by using the type (or name) of the running application, the data input field type of the running application, and/or the data input field hint of the running application, and the screen title included in the screen of the running application and/or the data input field title. For example, the data type corresponding to the data input field may include an email account (or email address), an application account (or application ID), an SNS account (or SNS ID), a phone number, or/and an account number.

In operation 418, the key input module 124 according to an embodiment may display a key input window (or keypad or soft keypad) for input of data corresponding to the identified data type on the display module 160. According to an embodiment, the key input module 124 may further display a neighbor search icon for requesting data corresponding to the identified data type from the outside, together with or separately from the key input window.

In operation 420, the key input module 124 according to an embodiment may identify at least one (neighboring external) electronic device 104. When the neighbor search icon is selected, the key input module 124 according to an embodiment may detect (or identify) the at least one (neighboring external) electronic device 104 by using the short-range wireless communication module. For example, the communication module 190 may include the short-range wireless communication module and identify the at least one (neighboring external) electronic device 104 by performing a scan operation through the short-range wireless communication module. For example, the short-range communication module may include a Wi-Fi communication module, an NFC communication module, a Bluetooth legacy communication module, a BLE communication module, and/or a UWB communication module.

For example, when the Wi-Fi communication module is used, the Wi-Fi communication module may receive at least one beacon message by performing a scan operation based on a Wi-Fi communication protocol, and identify the at least one (neighboring external) electronic device 104 based on the at least one beacon message. For example, when the Bluetooth legacy communication module or the BLE communication module is used, the Bluetooth legacy communication module or the BLE communication module may perform a scan operation based on a Bluetooth communication protocol and identify the at least one (neighboring external) electronic device 104 based on a scan result. For example, when the UWB communication module is used, the UWB communication module may perform a scan operation based on a UWB communication protocol and identify the at least one (neighboring external) electronic device 104 based on a scan result. In addition, the UWB communication module or the key input module 124 may obtain distance information (e.g., ranging information) between the electronic device 101 and each of the at least one (external) electronic device 104 by calculating a time taken to transmit and receive UWB signals (e.g., a ranging request message and a ranging response message) between the electronic device 101 and each of the at least one (external) electronic device 104. In addition, the UWB communication module or the key input module 124 may receive a ranging response signal transmitted in response to a ranging request message by a first external electronic device (e.g., one of the at least one external electronic device) through a plurality of antennas, and obtain direction information (e.g., an AOA) about the first external electronic device by using a difference between reception times of the ranging response signals at the plurality of antennas. In this manner, direction information about each of the at least one (external) electronic device 104 may be obtained.

The key input module 124 according to an embodiment may further use the sensor module 176 (e.g., the gyro sensor) in addition to the short-range communication module to identify the at least one (neighboring external) electronic device 104. For example, the key input module 124 may obtain information about a magnetic north direction, which is an absolute direction, through the gyro sensor, identify a direction in which each of the at least one (external) electronic device 104 is located based on a difference between the information about the magnetic north direction and direction information about the external electronic device, which is a relative direction, obtained through UWB communication, and identify an external electronic device in a specified direction among the at least one external electronic device.

The key input module 124 according to an embodiment may use the camera module 180 in addition to the short-range communication module and the sensor module 176 (e.g., the gyro sensor) to identify the at least one (neighboring external) electronic device 104. For example, the key input module 124 may identify an external electronic device which is neighboring to the electronic device 101 and being captured by the camera module 180 based on the direction of each of the at least one (external) electronic device 104 with respect to the electronic device, obtained by using the gyro sensor and the UWB communication module and a capturing direction of the camera module 180.

According to an embodiment, the at least one (external) electronic device 104 is one external electronic device or two or more external electronic devices.

In operation 422, the key input module 124 according to an embodiment may transmit a message requesting confirmation of provision availability of data corresponding to the identified data type to the at least one identified (external) electronic device 104 through the communication module 190. For example, when the identified data type is an e-mail account, the key input module 124 may transmit a message requesting confirmation of provision availability of an e-mail account to the at least one (external) electronic device 104 through the communication module 190.

In operation 424, the at least one (external) electronic device 104 according to an embodiment may transmit a message indicating availability of data corresponding to the identified data type in response to the reception of the message requesting confirmation of provision availability of data corresponding to the identified data type. For example, when the at least one (external) electronic device 104 receives the message requesting confirmation of provision availability of an e-mail account, it may identify whether there is a stored e-mail account and whether the stored e-mail account is set to be available, and when there is a stored e-mail account and the stored e-mail account is set to be available, provide a message indicating availability of an e-mail account. For example, when there is no stored e-mail account or when the stored e-mail account is not set to be available, the at least one (external) electronic device 104 may not transmit the message indicating availability of an e-mail account or may transmit a message indicating unavailability of an e-mail account.

In operation 426, the key input module 124 according to an embodiment may display information about at least one (external) electronic device 104 capable of providing data corresponding to the identified data type. For example, the key input module 124 may identify the at least one (external) electronic device 104 capable of providing data corresponding to the identified data type based on the reception of the message indicating availability of data corresponding to the identified data type from the at least one (external) electronic device 104, and display information (e.g., user profile information) about each of the at least one external electronic device. The user profile information may include a user picture, a user name, a user nickname, or/and a user ID. Although it has been described in operation 426 that the message indicating availability of data corresponding to the identified data type is received from all of the at least one (external) electronic device 104, by way of example, the message indicating availability of data corresponding to the identified data type may not be received or may be received only from some external electronic devices.

In operation 428, the key input module 124 according to an embodiment may select information about an external electronic device from which data is to be received from the displayed information about each of the at least one (external) electronic device 104 based on a user input. For example, the key input module 124 may select an external electronic device corresponding to a user profile selected based on a user input from among user profiles of the at least one (external) electronic device 104.

In operation 430, the key input module 124 according to an embodiment may transmit a message requesting data corresponding to the identified data type to the selected external electronic device.

In operation 432, the selected external electronic device according to an embodiment may identify whether transmission of data corresponding to the identified data type is accepted based on the message requesting data corresponding to the identified data type. For example, the selected external electronic device may display the reception of the message requesting data corresponding to the identified data type on the display and identify whether the data transmission is accepted based on a user input.

In operation 434, the selected external electronic device according to an embodiment may transmit data corresponding to the identified data type to the electronic device 101 based on data transmission acceptance. For example, when the identified data type is an email account, the selected external electronic device may transmit email account data to the electronic device 101.

In operation 436, the key input module 124 according to an embodiment may transmit the data received from the selected external electronic device to the application module 122 to enter the data into the data input field.

In operation 438, the application module 122 according to an embodiment may enter the received data into the data input field and display the data input field into which the received data is entered.

Figure 5:
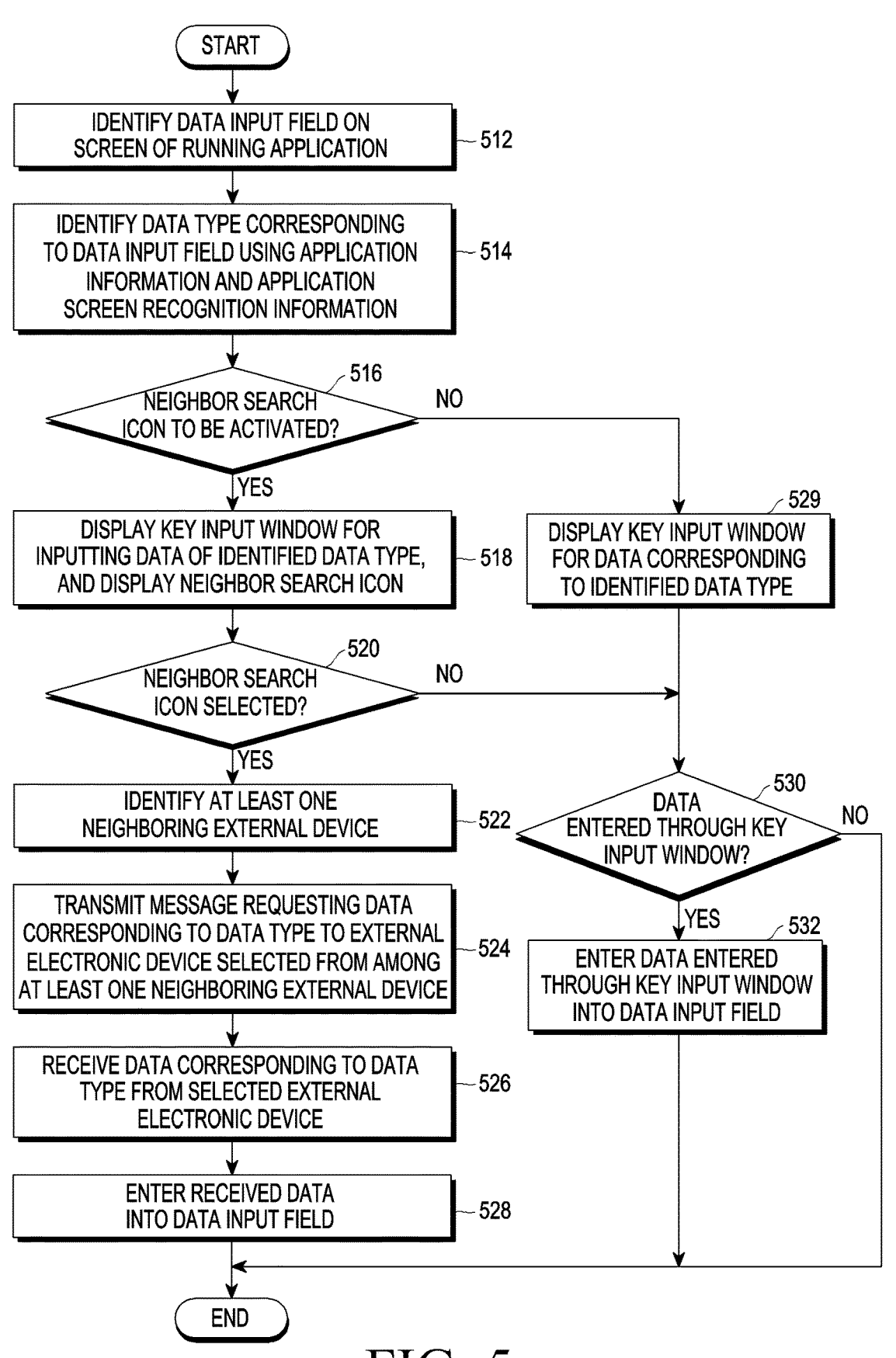
FIG. 5 is a diagram illustrating an operation of entering data using a neighbor search icon in an electronic device according to an embodiment.

FIG. 5 is a diagram illustrating an operation of entering data by using a neighbor search icon in an electronic device according to an embodiment.

Referring to FIG. 5, the processor 120 of the electronic device 101 according to an embodiment may perform at least one of operations 512 to 532.

In operation 512, the processor 120 according to an embodiment may identify a data input field requiring data input, while displaying an application execution screen.

In operation 514, the processor 120 according to an embodiment may identify a data type corresponding to the data input field by using information about a running application and/or screen recognition information about the running application. The information about the running application according to an embodiment may be information included in an application program stored in the memory 130, and include the type (or name) (e.g., a mail application, an SNS application, a contact application, a money transfer application, or a game application) of the running application, a data input field type (e.g. a text type, a number type, an account type, or any other type (e.g. image type)) of the running application, and/or a data input field hint (e.g., a description of data required for a text input field) of the running application. The application screen recognition information according to an embodiment may include text information (e.g., a screen title, a data input field title, and/or other text included in an application screen) included in an application screen obtained through screen recognition (e.g., text recognition on the application screen) of the running application. The processor 120 according to an embodiment may identify the data type corresponding to the data input field by using the type (or name) of the running application, the data input field type of the running application, and/or the data input field hint of the running application, and the screen title included in the screen of the running application and/or the data input field title. For example, the data type corresponding to the data input field may include an email account (or email address), an application account (or application ID), an SNS account (or SNS ID), a phone number, or/and an account number.

In operation 516, the processor 120 according to an embodiment may identify whether a neighbor search icon is to be activated based on the identified data type. According to an embodiment, when the data type corresponding to the identified data input field is a specified data type, the processor 120 may identify that the neighbor search icon is to be activated. According to an embodiment, when the data type corresponding to the identified data input field is not the specified data type, the processor 120 may identify that the neighbor search icon is to be deactivated. For example, the specified data type may be a data type specified to be sharable between the electronic device 101 and the (external) electronic device 104. For example, the specified data type may include a data type used in an application (e.g., a contact application or/and an authentication application) commonly used by the electronic device 101 and the (external) electronic device 104.

In operation 518, when identifying that the neighbor search icon is to be activated, the processor 120 according to an embodiment may display a key input window for input of data corresponding to the identified data type and display (or activate) the neighbor search icon.

In operation 520, the processor 120 according to an embodiment may identify whether the neighbor search icon has been selected.

In operation 522, when the neighbor search icon has been selected, the processor 120 according to an embodiment may identify at least one neighboring external electronic device through short-range wireless communication (e.g., Bluetooth communication, BLE communication, UWB communication, and/or WiFi communication).

In operation 524, the processor 120 according to an embodiment may transmit a message requesting data corresponding to the identified data type to an external electronic device selected from among the at least one neighboring external electronic device.

In operation 526, the processor 120 according to an embodiment may receive data corresponding to the identified data type from the selected external electronic device.

In operation 528, the processor 120 according to an embodiment may enter the data received from the selected (external) electronic device 104 into the data input field.

In operation 529, when identifying that the neighbor search icon is to be deactivated, the processor 120 according to an embodiment may display the key input window for input of data corresponding to the identified data type, without displaying (or activating) the neighbor search icon.

In operation 530, the processor 120 according to an embodiment may identify whether data has been entered through the key input window.

In operation 532, when data has been entered through the key input window, the processor 120 according to an embodiment may enter the data entered through the key input window into the data input field.

Figure 6:
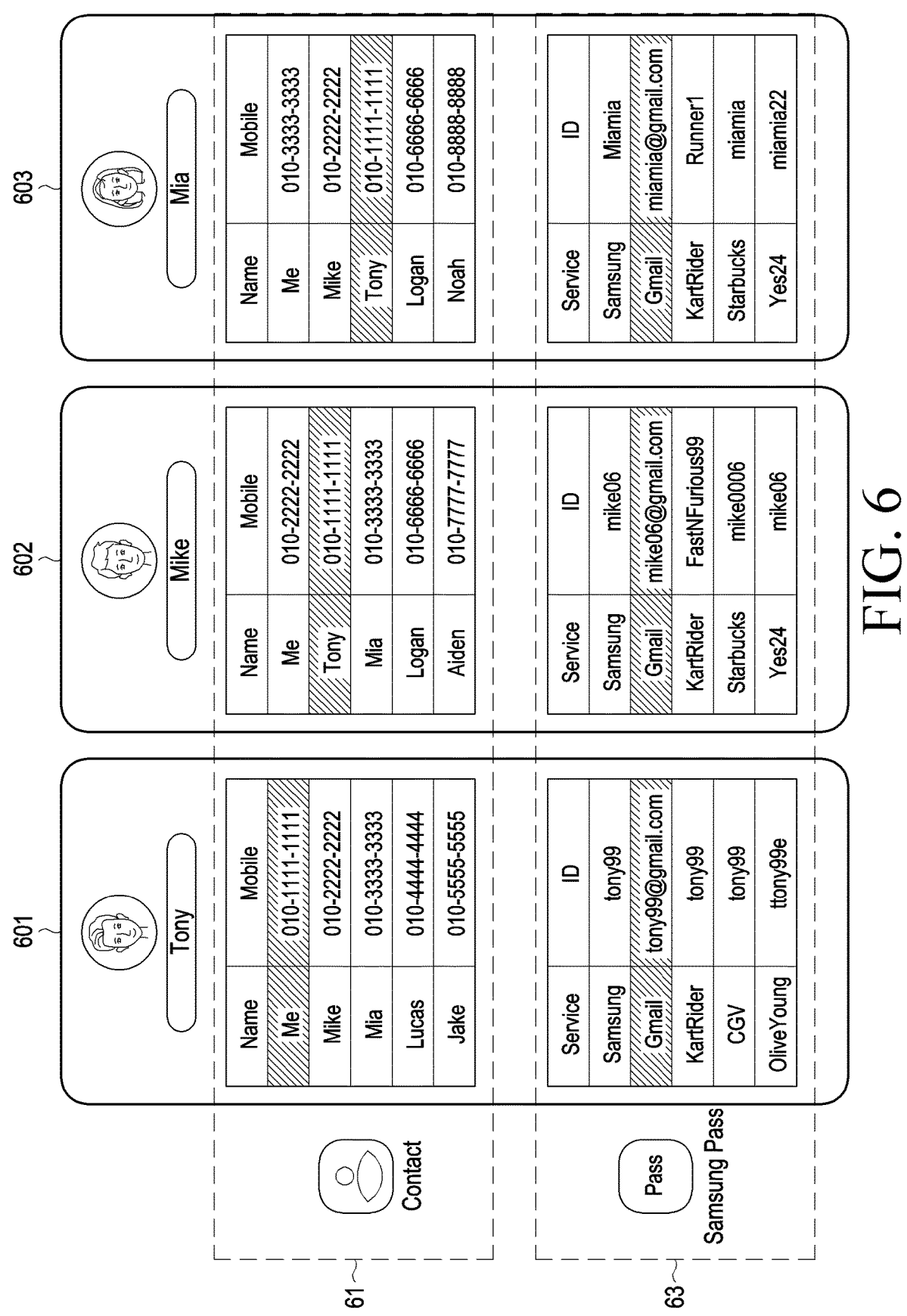
FIG. 6 is a diagram illustrating an exemplary data type specified to be sharable between electronic devices according to an embodiment.

FIG. 6 is a diagram illustrating an example of a data type specified to be sharable between electronic devices according to an embodiment.

Referring to FIG. 6, electronic devices 601, 602, and 603 according to an embodiment may specify data managed (or used) in a commonly used application (e.g., a contact application 61 (e.g., contact) or/and an authentication application 63 (e.g., Samsung Pass)) as sharable data.

For example, data that the electronic device 601 of a first user (e.g., Tony) may request from the electronic device 602 of a second user (e.g., Mike) or the electronic device 603 of a third user (e.g., Mia), which is a neighboring external electronic device, may be data managed (or used) in the application (e.g., the contact application 61 or/and the authentication application 63) commonly used by the electronic devices 601, 602, and 603. For example, the data managed (or used) in the contact application 61 may include a phone number, and the data managed (or used) in the authentication application 63 may include a service ID (or account).

Figure 7A:
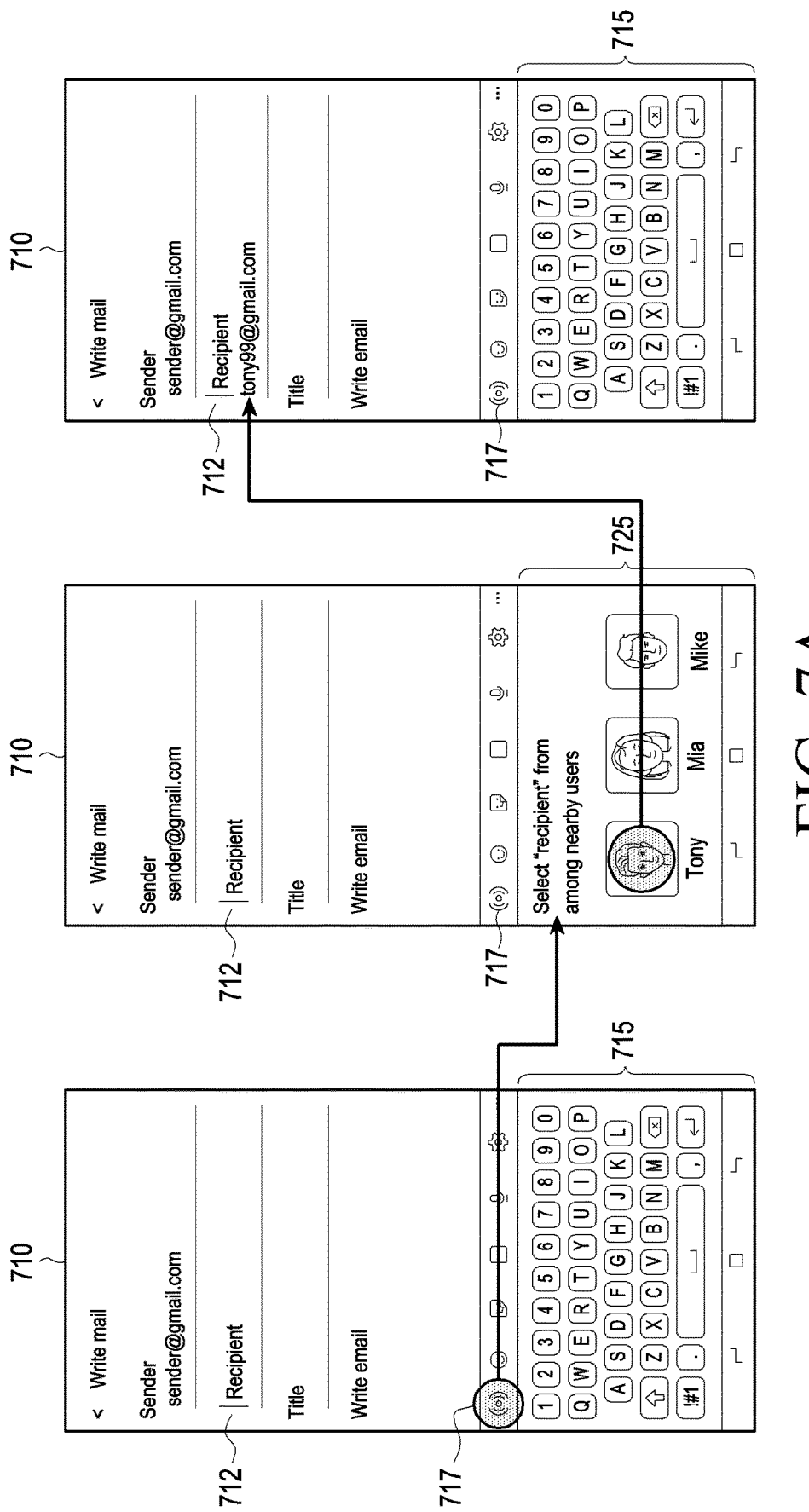
FIG. 7A is a diagram illustrating a screen when data to be entered into a data input field is requested during execution of a mail application in an electronic device according to an embodiment.
Figure 7B:
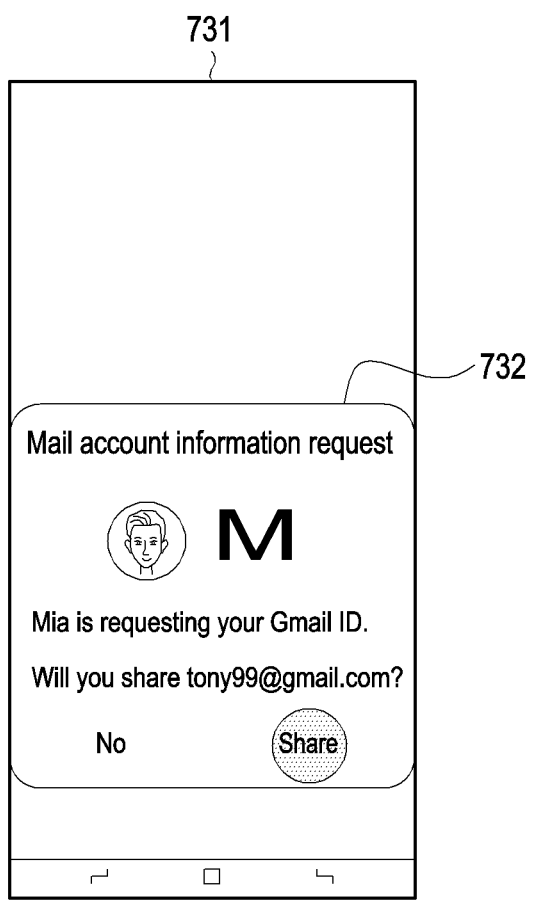
FIG. 7B is a diagram illustrating a screen when a request for data to be entered into a data input field is received in an external electronic device according to an embodiment.

FIG. 7A is a diagram illustrating a screen when an electronic device requests data to be entered into a data input field during execution of a mail application according to an embodiment, and FIG. 7B is a diagram illustrating a screen when an external electronic device receives a request for data to be entered into a data input field according to an embodiment.

Referring to FIG. 7A, the processor 120 of the electronic device 101 according to an embodiment may display a write mail screen 710 on the display module 160 during execution of a mail application. The processor 120 according to an embodiment may identify a data input field 712 requiring data input, while displaying the write mail screen 710. The processor 120 according to an embodiment may identify a data type corresponding to the data input field 712 by using information about the running mail application and screen recognition information about the running mail application. For example, the processor 120 may identify the data type corresponding to the data input field 712 as an email account (or email address) based on the type (or name) of the running application being "mail", the data input field type of the running application being "email", and a running data input field hint being "recipient".

The processor 120 according to an embodiment may display a key input window 715 for inputting data corresponding to the identified data type and a neighbor search icon 717 based on the identified data type being an email account (or email address). For example, the processor 120 may display the neighbor search icon 717 based on the identified data type being a specified data type. According to an embodiment, when the neighbor search icon 717 is selected, the processor 120 may identify at least one neighboring external electronic device through short-range wireless communication (e.g., Bluetooth communication, BLE communication, UWB communication, and/or WiFi communication), and display information 725 about at least one external electronic device capable of providing data corresponding to the identified data type among the at least one identified neighboring external electronic device. For example, the information 725 about the at least one external electronic device may include at least one piece of user profile information. The user profile information may include a user picture, a user name, a user nickname, or/and a user ID.

According to an embodiment, when one (e.g., Tony) of the at least one piece of profile information is selected, the processor 120 may request an email address from a selected external electronic device corresponding to the selected user profile. According to an embodiment, the processor 120 may receive the email address from the selected external electronic device in response to the email address request. According to an embodiment, the processor 120 may enter the email address (tony99@gmail.com) received from the selected external electronic device into the data input field 712.

Referring to FIG. 7B, when receiving an email address request from the electronic device 101, the processor of the (external) electronic device 104 according to an embodiment may display a message 732 asking whether to share an email address on the display screen 731. When a user selects sharing the email address, the processor of the external electronic device according to an embodiment may transmit the email address to the electronic device 101.

Figure 8A:
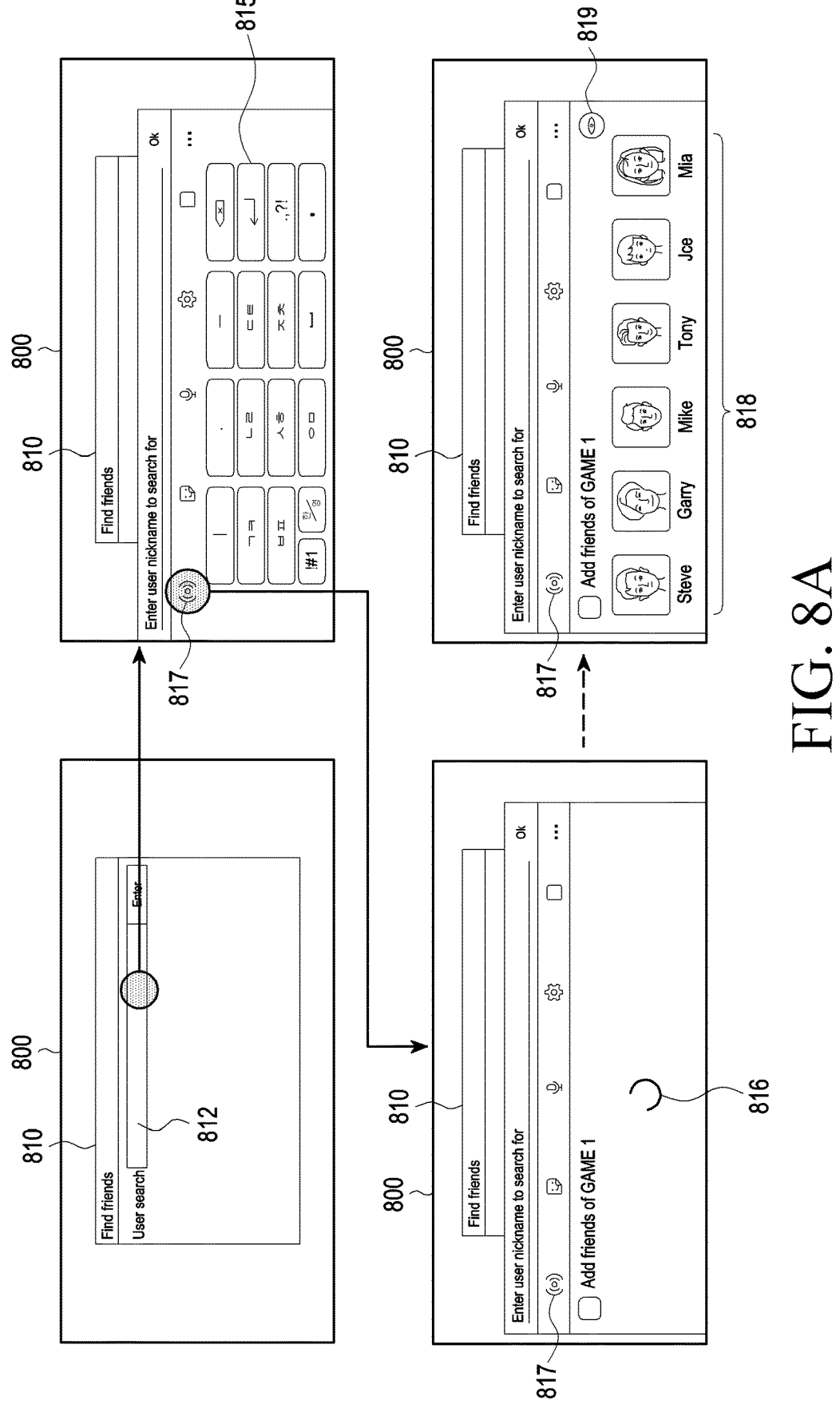
FIG. 8A is a diagram illustrating a screen when external electronic devices capable of providing data of a data type to be entered into a data input field are displayed during execution of a game application in an electronic device according to an embodiment.

FIG. 8A is a diagram illustrating a screen when an electronic device displays external electronic devices capable of providing data of a data type to be entered into a data input field during execution of a game application according to an embodiment.

Referring to FIG. 8A, the processor 120 according to an embodiment may display a find friends window 810 while displaying a game application screen 800 on the display module 160. The processor 120 according to an embodiment may identify a data input field 812 requiring data input, while displaying the find friends window 810. The processor 120 according to an embodiment may identify a data type corresponding to the data input field 812 by using information about the running game application and screen recognition information about the running game application. For example, the processor 120 may identify the data type corresponding to the data input field as a GAME 1 account (or GAME 1 ID) based on the type (or name) of the running application being "GAME 1", the data input field type of the running application being "text", a running data input field hint being "enter user name to search for", a screen title included in the application screen being "Find Friends", and the title of the data input field included in the application screen being "User Search".

The processor 120 according to an embodiment may display a key input window 815 for inputting data corresponding to the identified data type and a neighbor search icon 817 based on the identified data type being the GAME 1 account (or GAME 1 ID). For example, the processor 120 may display the neighbor search icon 817 based on the identified data type being a specified data type. According to an embodiment, when the neighbor search icon 817 is selected, the processor 120 may identify at least one neighboring external electronic device through short-range wireless communication (e.g., Bluetooth communication, BLE communication, UWB communication, and/or WiFi communication). For example, the processor 120 may display an indicator 816 indicating that at least one neighboring external electronic device is being identified. According to an embodiment, the processor 120 may display information 818 about at least one external electronic device capable of providing data corresponding to the identified data type among the at least one identified external electronic device. For example, the information 818 about the at least one external electronic device may include at least one piece of user profile information (e.g., Steve, Garry, Mike, Tom, Joe, and Mia). The user profile information may include a user picture, a user name, a user nickname, or/and a user ID. According to an embodiment, the processor 120 may display an augmented reality (AR) icon 819 for selecting one of the at least one external electronic device, together with the information 818 about the at least one external electronic device capable of providing data corresponding to the identified data type.

Figure 8B:
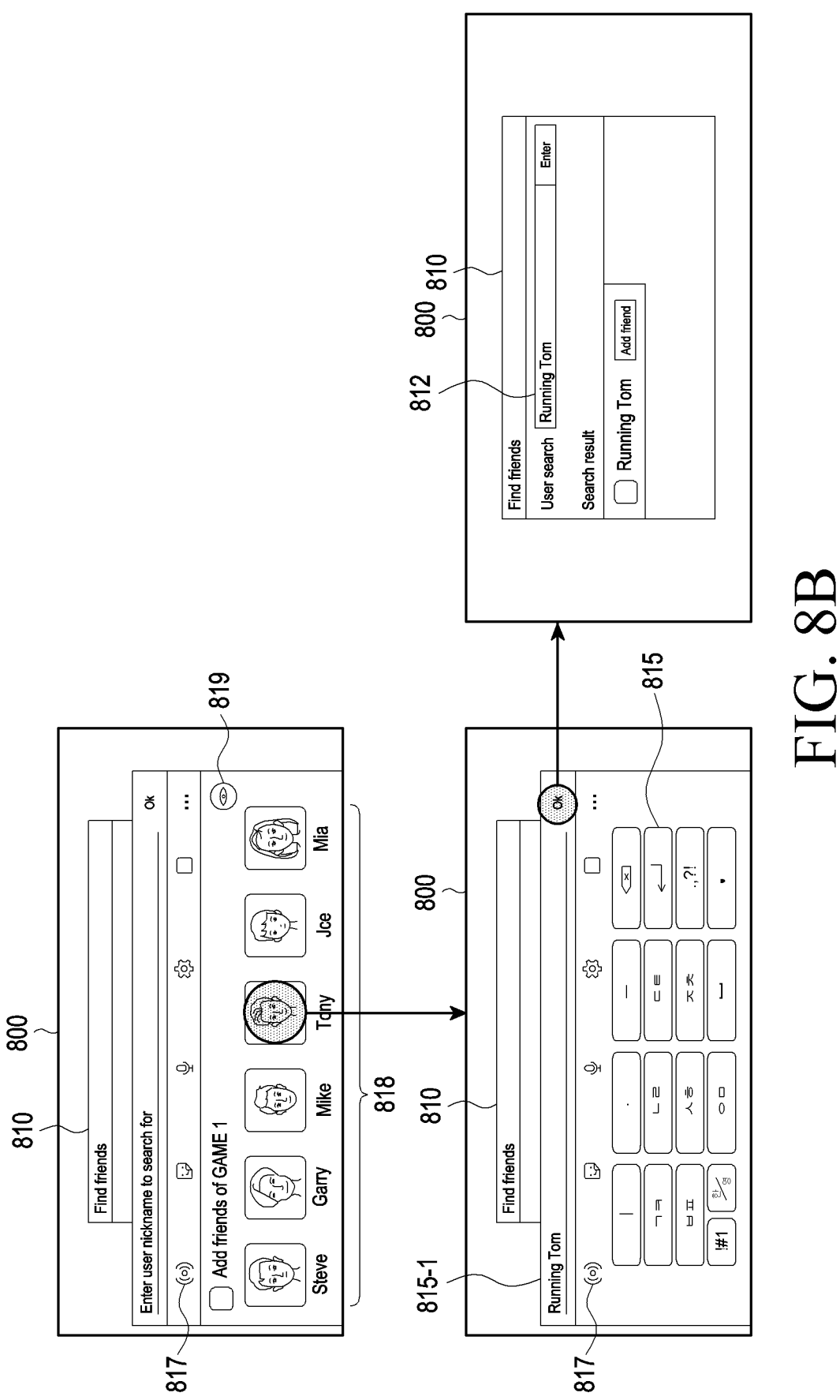
FIG. 8B is a diagram illustrating a screen when an external electronic device from which data is to be received is selected from information about at least one external electronic device capable of providing data of an identified data type according to an embodiment.

FIG. 8B is a diagram illustrating a screen when an external electronic device to receive data is selected from information about at least one external electronic device capable of providing data of an identified data type according to an embodiment.

Referring to FIG. 8B, when one (e.g., Tom) of at least one piece of user profile information (e.g., Steve, Garry, Mike, Tom, Joe, Mia) 818 is selected, the processor 120 according to an embodiment may request a GAME 1 account (or GAME 1 ID) from an external electronic device of selected Tom. According to an embodiment, the processor 120 may receive the GAME 1 account (or GAME 1 ID) from the external electronic device of selected Tom in response to the request for the GAME 1 account (or GAME 1 ID). According to an embodiment, the processor 120 may display the GAME 1 account (or GAME 1 ID) (Running Tom) received from the external electronic device of selected Tom in an input area 815-1 of the key input window 815, and then enter Running Tom into the data input field 812 according to OK selection.

Figure 8C:
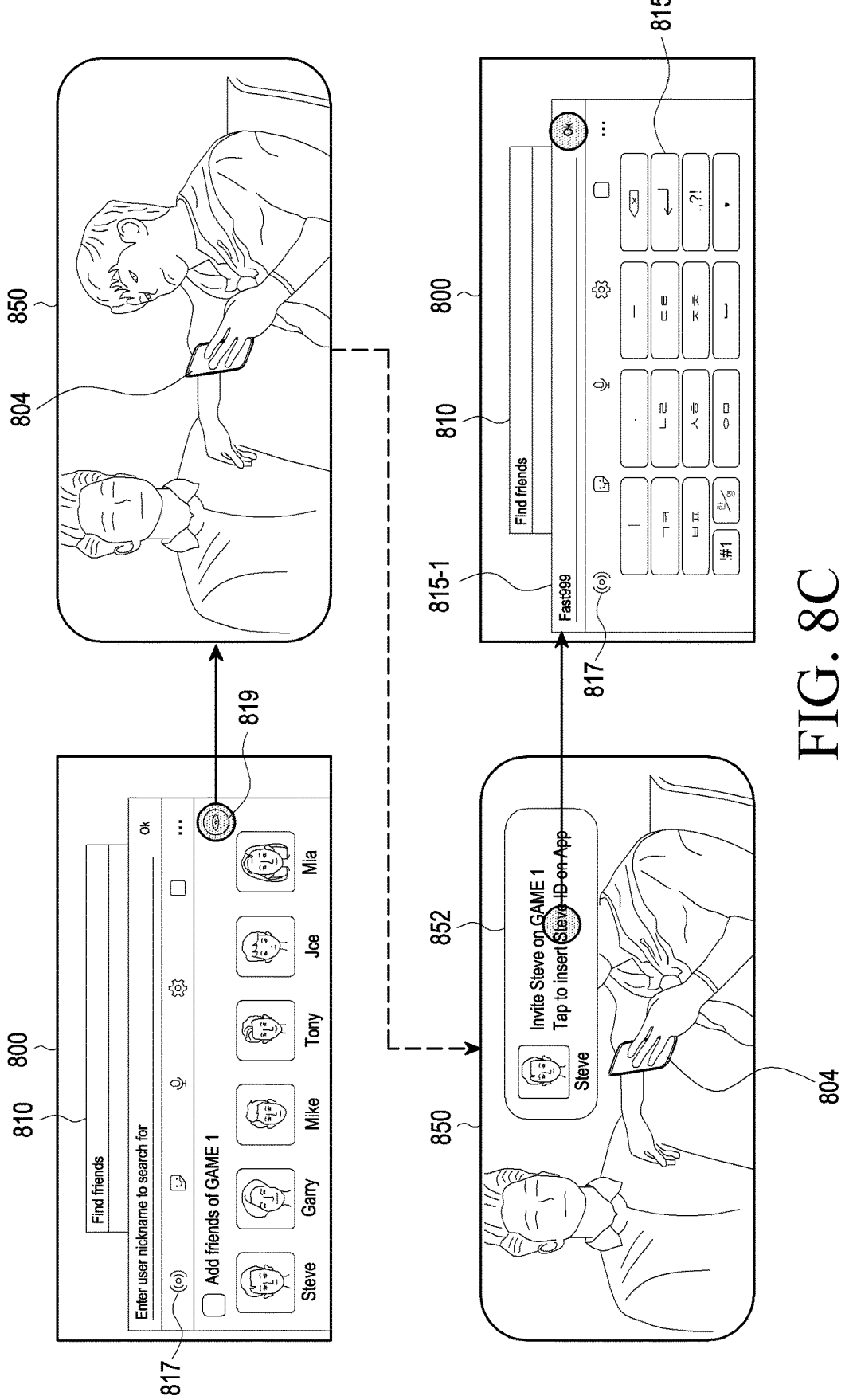
FIG. 8C is a diagram illustrating a screen when an external electronic device from which data is to be received is selected using an augmented reality (AR) icon according to an embodiment.

FIG. 8C is a diagram illustrating a screen when an external electronic device to receive data is selected by using the AR icon 819 according to an embodiment.

Referring to FIG. 8C, the processor 120 according to an embodiment may select the AR icon 819, instead of selecting one of the at least one piece of user profile information (e.g., Steve, Garry, Mike, Tom, Joe, Mia) 818. When the processor 120 according to an embodiment selects the AR icon 819, an AR function may be executed and an image 850 captured through the camera module 180 may be displayed. The processor 120 according to an embodiment may display, in the image 850, user profile information (Steve) 852 about the (external) electronic device 104 in the image 850 captured by steering the electronic device 101 through UWB communication. According to an embodiment, when the user profile information (Steve) 852 about the (external) electronic device 104 in the image 850 is selected, the processor 120 may provide a GAME 1 account (or GAME 1 ID) to the (external) electronic device 104 of selected Steve. According to an embodiment, the processor 120 may receive the GAME 1 account (or GAME 1 ID) (Fast999) from the (external) electronic device 104 of Steve in response to the GAME 1 account (or GAME 1 ID) request.

According to an embodiment, the processor 120 may display the GAME 1 account (or GAME 1 ID) (Fast999) received from the (external) electronic device 104 of selected Steve, and then enter Fast999 in the data input field 812 according to OK selection.

Figure 9:
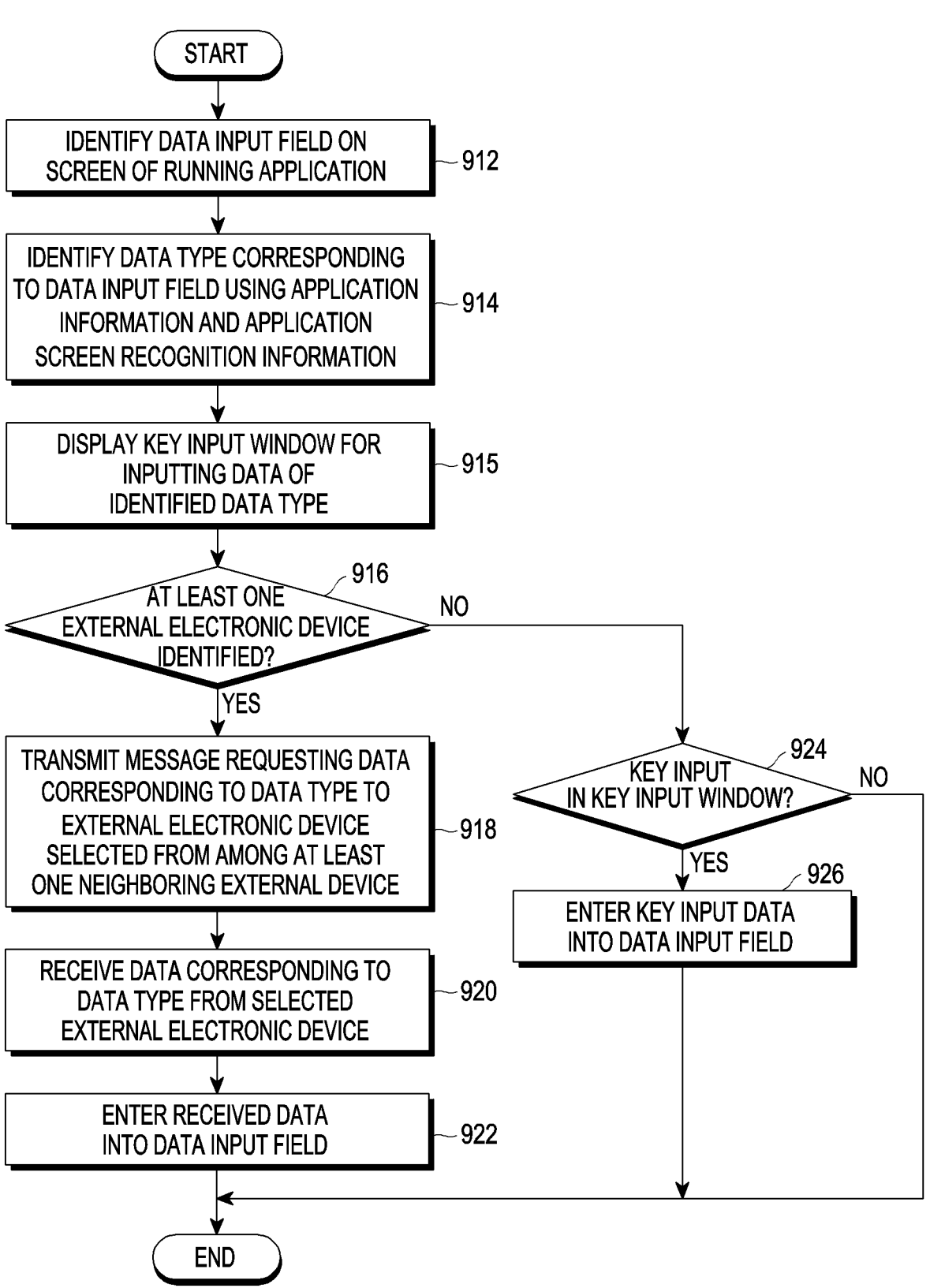
FIG. 9 is a diagram illustrating an operation of entering data using proximity sensing in an electronic device according to an embodiment.

FIG. 9 is a diagram illustrating a data input operation using proximity sensing in an electronic device according to an embodiment.

Referring to FIG. 9, the processor 120 of the electronic device 101 according to an embodiment may perform at least one of operations 912 to 926.

In operation 912, the processor 120 according to an embodiment may identify a data input field requiring data input, while displaying an application execution screen.

In operation 914, the processor 120 according to an embodiment may identify a data type corresponding to the data input field by using information about a running application and screen recognition information about the running application. The information about the running application according to an embodiment may be information included in an application program stored in the memory 130, and include the type (or name) (e.g., a mail application, an SNS application, a contact application, a money transfer application, or a game application) of the running application, a data input field type (e.g. a text type, a number type, an account type, or any other type (e.g. image type)) of the running application, and/or a data input field hint (e.g., a description of data required for a text input field) of the running application. The application screen recognition information according to an embodiment may include text information (e.g., a screen title, a data input field title, and/or other text included in an application screen) included in an application screen obtained through screen recognition (e.g., text recognition on the application screen) of the running application. The processor 120 according to an embodiment may identify the data type corresponding to the data input field by using the type (or name) of the running application, the data input field type of the running application, and/or the data input field hint of the running application, and the screen title included in the screen of the running application and/or the data input field title. For example, the data type corresponding to the data input field may include an email account (or email address), an application account (or application ID), an SNS account (or SNS ID), a phone number, or/and an account number.

In operation 915, the processor 120 according to an embodiment may display a key input window for inputting data corresponding to the identified data type.

In operation 916, the processor 120 according to an embodiment may identify at least one (neighboring external) electronic device 104 by using the communication module 190 (e.g., the short-range wireless communication module), the sensor module 176 (e.g., the gyro sensor), and/or the camera module 180. According to an embodiment, the at least one (external) electronic device 104 may be one external electronic device or two or more external electronic devices. For example, the processor 120 may identify the at least one (external) electronic device 104 neighboring to the electronic device 101.

In operation 918, when there is at least one identified neighboring external electronic device, the processor 120 according to an embodiment may transmit a message requesting data corresponding to the identified data type to an external electronic device selected from among the at least one neighboring external electronic device.

In operation 920, the processor 120 according to an embodiment may receive data corresponding to the identified data type from the selected external electronic device.

In operation 922, the processor 120 according to an embodiment may enter the data received from the selected (external) electronic device 104 into the data input field.

In operation 924, when there is not at least one identified neighboring external electronic device, the processor 120 according to an embodiment may identify whether data has been entered into the key input window.

In operation 926, when data has been entered into the key input window, the processor 120 according to an embodiment may enter the data input through the key input window into the data input field.

Figure 10:
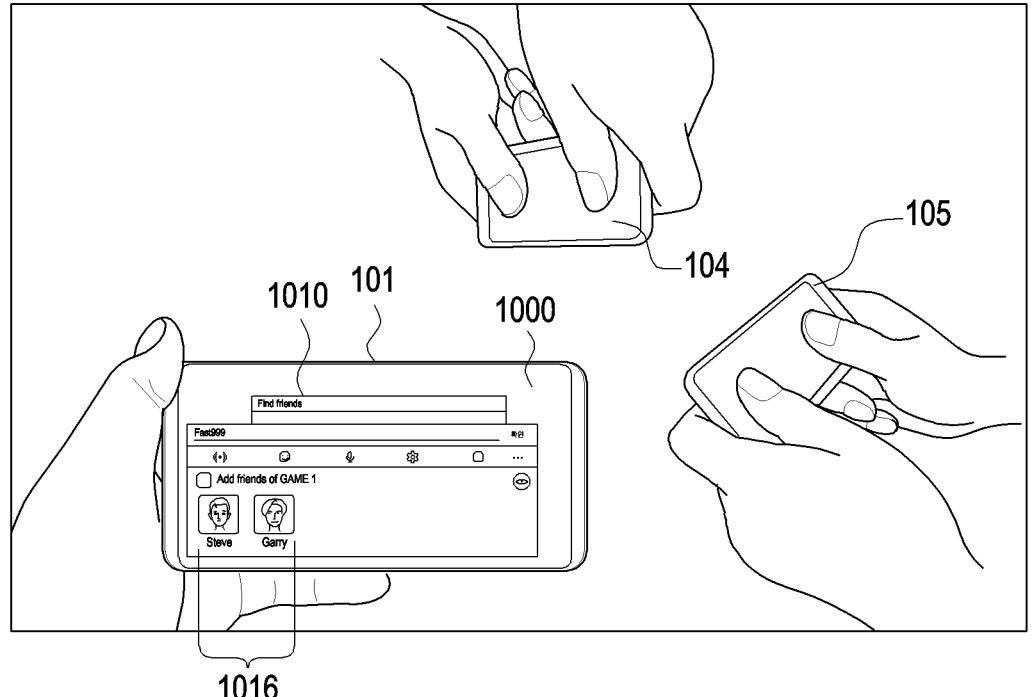
FIG. 10 is a diagram illustrating a case in which a friend identifier (ID) is entered into a friend invitation data field using proximity sensing during execution of a game application in an electronic device according to an embodiment.

FIG. 10 is a diagram illustrating a case in which a friend ID is entered into a friend invitation data field during execution of a game application in an electronic device according to an embodiment.

Referring to FIG. 10, according to an embodiment, the electronic device 101 may need to invite a user of each of external electronic devices 104 and 105 as a friend to participate in a game during play of a game through a game application. The processor 120 of the electronic device 101 may execute the game application and display a game application screen 1000 according to a user input, and may display a find friends window 1010 according to selection of a find friends menu. The processor 120 may identify a data input field requiring data input while displaying the find friends window 1010. The processor 120 according to an embodiment may identify a data type corresponding to a data input field as a friend ID by using information about the running game application and screen recognition information about the running game application. The processor 120 according to an embodiment may identify the external electronic devices 104 and 105 identified by the electronic device 101, and display information 1016 about external electronic devices capable of providing friend IDs among the identified neighboring external electronic devices 104 and 105. The information 1016 about the external electronic devices capable of providing friend IDs may include user profile information about each of the external electronic devices 104 and 105. The processor 120 according to an embodiment may receive a friend ID from each of the external electronic devices 104 and 105 according to sequential selection of user profile information about the external electronic devices 104 and 105 from the user, invite the friends, and play the game together with the users of the external electronic devices 104 and 105.

Figure 11:
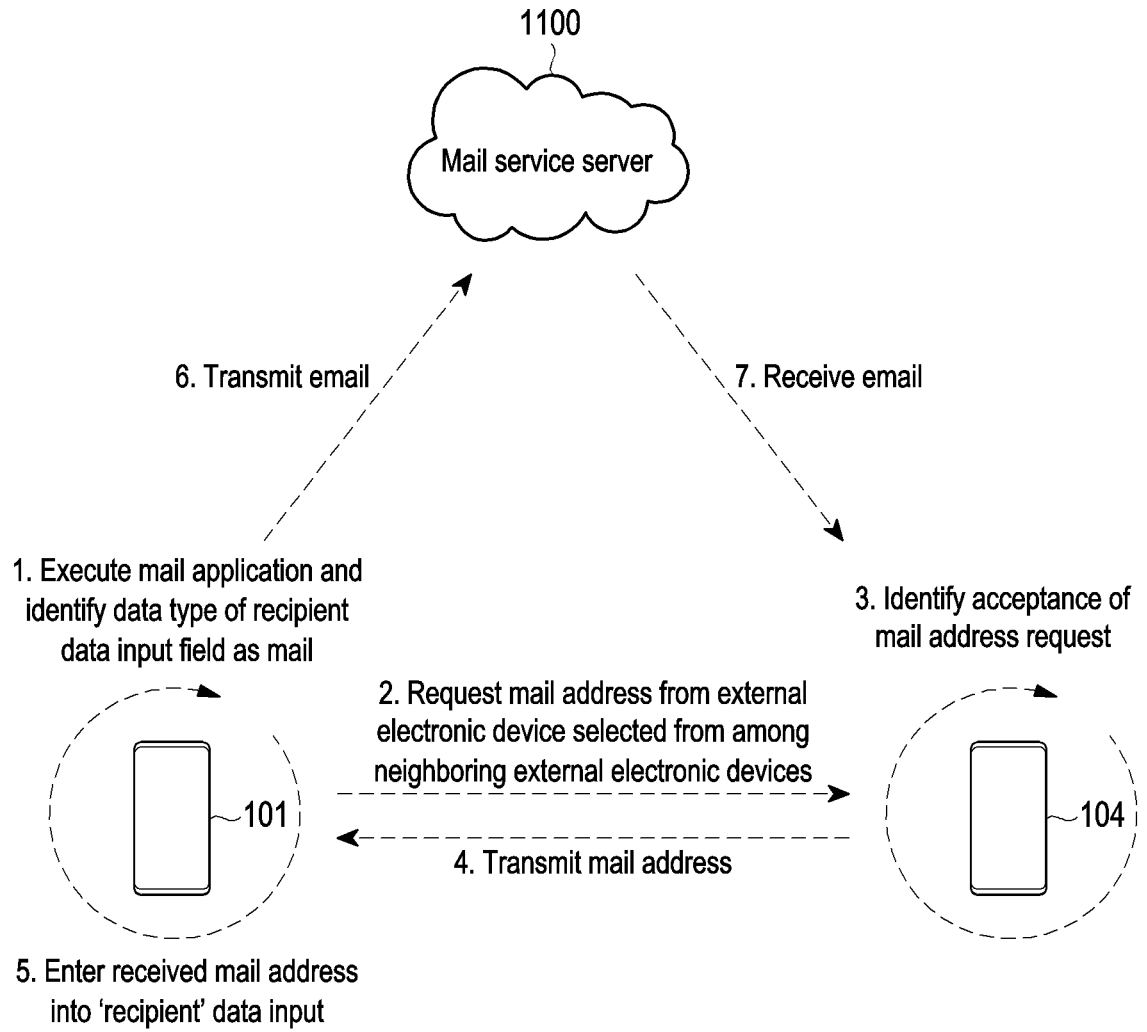
FIG. 11 is a diagram illustrating an example of receiving a mail address from an external electronic device and transmitting a mail in an electronic device according to an embodiment.

FIG. 11 is a diagram illustrating an example in which an electronic device receives a mail address from an external electronic device and transmits a mail according to an embodiment.

Referring to FIG. 11, at operation 1, the electronic device 101 according to an embodiment may execute a mail application and identify the data type of a recipient data input field as a mail address (or mail account).

At operation 2, the electronic device 101 may search for neighboring external electronic devices and request a mail address, which is the identified data type, from an external electronic device selected from among the detected external electronic devices.

At operation 3, the (external) electronic device 104 may display the mail address request and identify acceptance of the mail address request from the user of the (external) electronic device 104.

At operation 4, the (external) electronic device 104 may transmit the user's mail address to the electronic device 101 in response to the acceptance of the mail address request.

At operation 5, the electronic device 101 may enter the received mail address into the recipient data input field of the mail application.

At operation 6, the electronic device 101 may request a mail service server 1100 to send an email to the recipient of the received mail address through communication.

At operation 7, the (external) electronic device 104 may receive the email from the electronic device 101 through the mail service server 1100. According to this mail transmission example, when the user does not know the user's mail address of the external electronic device or has difficulty in entering the user's mail address, the user may obtain the mail address through communication and enable automatic entry of the mail address into the data input field.

Figure 12:
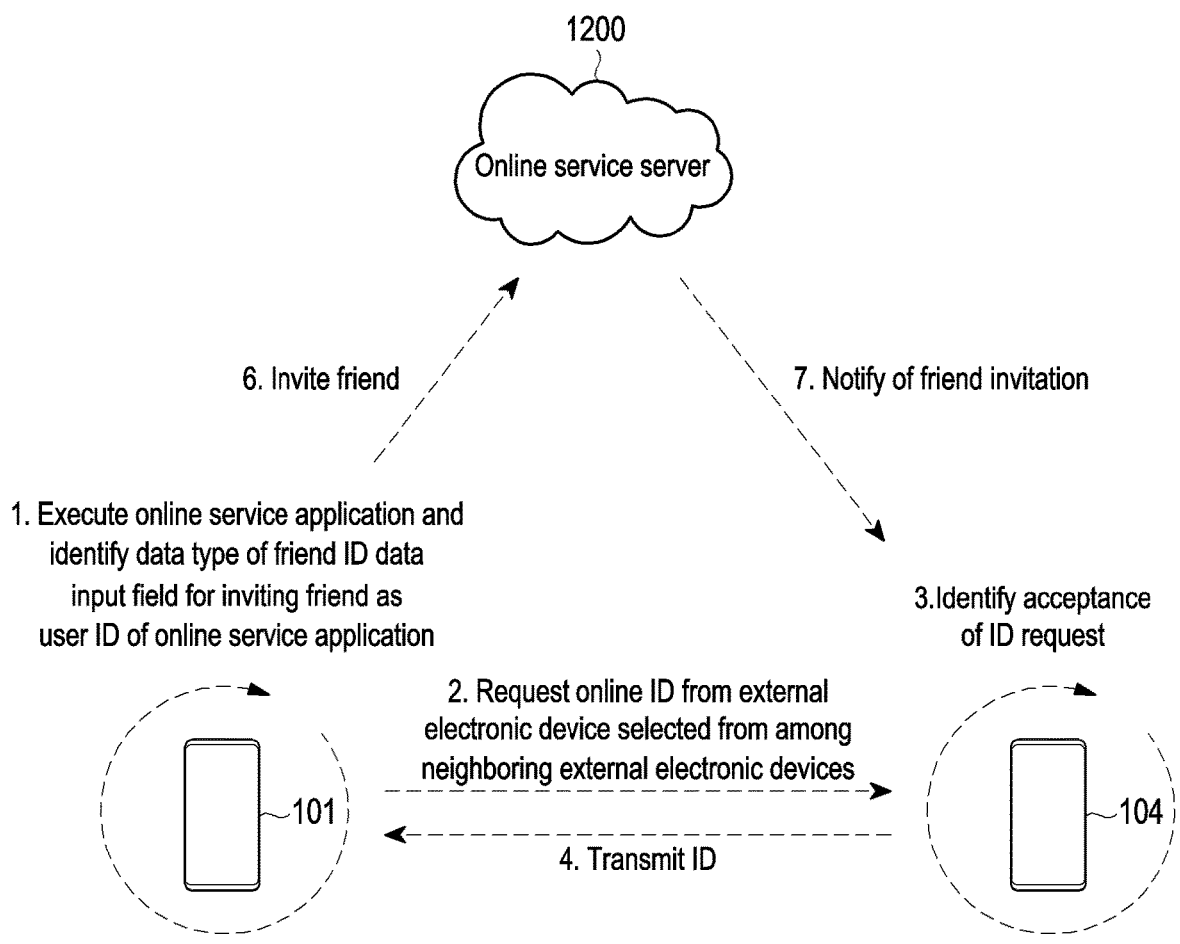
FIG. 12 is a diagram illustrating an example of inviting a friend by receiving a friend ID of an application service from an external electronic device in an electronic device according to an embodiment.

FIG. 12 is a diagram illustrating an example of inviting a friend by receiving a friend ID of an application service from an external electronic device in an electronic device according to an embodiment.

Referring to FIG. 12, at operation 1, the electronic device 101 according to an embodiment may execute an online service application (e.g., a game application, an SNS application, or any other type of online service application) and identify the data type of a friend ID data input field for inviting friends as a user ID of the online service application.

At operation 2, the electronic device 101 may search for neighboring external electronic devices and request a user ID of the online service application, which is the identified data type, from an external electronic device selected from among the detected external electronic devices.

At operation 3, the (external) electronic device 104 may display the request for the user ID of the online service application and identify acceptance of the request for the user ID of the online service application from the user of the (external) electronic device 104.

At operation 4, the (external) electronic device 104 may transmit the user ID of the online service application to the electronic device 101 in response to the acceptance of the request for the user ID of the online service application.

At operation 5, the electronic device 101 may enter the received user ID into the friend ID data input field for friend invitation of the online service application.

At operation 6, the electronic device 101 may request invitation of the user ID received from the online service server 1200 as a friend.

At operation 7, the (external) electronic device 104 may receive an invitation notification notifying that it has been invited from the electronic device 101 through an online service server 1200. According to this online service friend invitation example, when a user does not know or has difficulty in entering an online service user ID of an external electronic device, the user may obtain the online service user ID from the external electronic device through communication, and enable automatic entry of the online service user ID into the friend ID data input field.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

According to one or more embodiments, in a non-volatile storage medium storing instructions, the instructions may be configured to, when executed by at least one processor, cause the at least one processor to perform at least one operation. The at least one operation may include displaying an application screen of a running application on a display, identifying a data input field included in the application screen, identifying a data type corresponding to the data input field, displaying at least one external electronic device, around the electronic device, capable of providing data corresponding to the identified data type, receiving data corresponding to the identified data type from an external electronic device selected from among the at least one external electronic device through a communication module, and entering the received data into the data input field.

The embodiments of the disclosure described in the present specification and the drawings are only presented as specific examples to easily explain the technical content according to the embodiments of the disclosure and help understanding of the embodiments of the disclosure, not intended to limit the scope of the embodiments of the disclosure. Therefore, the scope of one or more embodiments of the disclosure should be construed as encompassing all changes or modifications derived from the technical spirit of one or more embodiments of the disclosure in addition to the embodiments disclosed herein.

What is claimed is:

1. An electronic device comprising:
communication circuitry;
a display;
memory storing instructions; and
at least one processor operatively connected to the communication circuitry, the display, and the memory,
wherein the instructions, when executed by the at least one processor individually or collectively, cause the electronic device to:
display an application screen of an application on the display,
identify a data input field on the application screen, identify a data type corresponding to the identified data input field using at least one of information about the application or screen recognition information about the application screen,
identify one or more external electronic devices by scanning using short-range communication through the communication circuitry,
transmit a message requesting a confirmation of capability of providing data corresponding to the identified data type to the one or more external electronic devices using the short-range communication through the communication circuitry,
receive a response to the message requesting the confirmation of capability of providing the data corresponding to the identified data type from at least one external electronic device,
display, on the application screen through the display, information corresponding to at least one external electronic device capable of providing the data corresponding to the identified data type,
receive the data corresponding to the identified data type from the at least one external electronic device, and
enter the received data into the data input field,
wherein the identified data type corresponds to the identified data input field on the application screen of the electronic device.

2. The electronic device of claim 1, wherein the instructions, when executed by the at least one processor individually or collectively, cause the electronic device to:
display a neighbor search icon on the display,
based on an input for the neighbor search icon, search for the one or more external electronic devices by using short-range communication through the communication circuitry, and
identify whether the one or more external electronic devices are capable of providing the data corresponding to the identified data type as a result of the search.

3. The electronic device of claim 2, wherein the instructions, when executed by the at least one processor individually or collectively, cause the electronic device to:
based on the data input field that is activated or selected, display a key input window for entering data into the data input field, together with the neighbor search icon, on the display.

4. The electronic device of claim 3, wherein the instructions, when executed by the at least one processor individually or collectively, cause the electronic device to:
display the received data in an input area of the key input window, and
enter the received data displayed in the input area into the data input field.

5. The electronic device of claim 1, further comprising a gyro sensor,
wherein the communication circuitry comprises ultra-wide band (UWB) communication circuitry, and
wherein the instructions, when executed by the at least one processor individually or collectively, cause the electronic device to:
obtain information about a magnetic north direction being an absolute azimuth through the gyro sensor,
obtain direction information about the at least one external electronic device through the UWB communication circuitry, and
identify an external electronic device in a specified direction with respect to the electronic device based on a difference between the information about the magnetic north direction and the direction information about the at least one external electronic device.

6. The electronic device of claim 5, further comprising a camera, wherein the instructions, when executed by the at least one processor individually or collectively, cause the electronic device to identify the external electronic device in an image captured using the camera among the at least one external electronic device based on the difference between the information about the magnetic north direction and the direction information about the at least one external electronic device and the image.

7. The electronic device of claim 1, wherein information about the application comprises at least one of an application type, a data input field type of the application, or a data input field hint of the application.

8. The electronic device of claim 1,
wherein the screen recognition information is obtained by performing screen recognition on the application screen.

9. The electronic device of claim 8, wherein the screen recognition comprises text recognition, and
wherein the screen recognition information comprises at least one of a screen title on the application screen or a data input field title on the application screen.

10. The electronic device of claim 1, wherein the data type corresponding to the data input field comprises at least one of an email account, an email address, an application account, an application identifier (ID), a social network service (SNS) account, a SNS ID, a phone number, or an account number.

11. The electronic device of claim 1, wherein the information corresponding to the at least one external electronic device includes user profile information corresponding to each of the at least one external electronic device.

12. A method of entering data into a data input field in an electronic device, the method comprising:
displaying an application screen of an application on a display;
identifying the data input field on the application screen;
identifying a data type corresponding to the identified data input field using at least one of information about the application or screen recognition information about the application screen;
identifying one or more external electronic devices by scanning using short-range communication through the communication circuitry;
transmitting a message requesting a confirmation of capability of providing data corresponding to the identified data type to the one or more external electronic devices using the short-range communication through the communication circuitry;
receiving a response to the message requesting the confirmation of capability of providing the data corresponding to the identified data type from at least one external electronic device;
displaying, on the application screen through the display, information corresponding to the at least one external electronic device capable of providing the data corresponding to the identified data type;
receiving the data corresponding to the identified data type from the at least one external electronic device through communication circuitry; and
entering the received data into the data input field,
wherein the identified data type corresponds to the identified data input field on the application screen of the electronic device.

13. The method of claim 12, further comprising:
displaying a neighbor search icon on the display;
based on an input for the neighbor search icon, searching for the one or more external electronic devices through the communication circuitry; and
identifying whether the one or more external electronic devices are capable of providing the data corresponding to the identified data type as a result of the search.

14. The method of claim 12, further comprising:
obtaining information about a magnetic north direction being an absolute azimuth through a gyro sensor,
obtaining direction information about the at least one external electronic device through the UWB communication circuitry, and
identifying an external electronic device in a specified direction with respect to the electronic device based on a difference between the information about the magnetic north direction and the direction information about the at least one external electronic device.

15. The method of claim 14, further comprising:
identifying the external electronic device in an image captured using a camera among the at least one external electronic device based on the difference between the information about the magnetic north direction and the direction information about the at least one external electronic device and the image.

16. The method of claim 12,
wherein the screen recognition information is obtained by performing screen recognition on the application screen.

17. A non-volatile storage medium storing instructions configured to, when executed by at least one processor of an electronic device, cause the at least one processor to perform:
displaying an application screen of an application on a display;
identifying a data input field on the application screen;
identifying a data type corresponding to the data input field using at least one of information about the application or screen recognition information about the application screen;
identifying one or more external electronic devices by scanning using short-range communication through the communication circuitry;
transmitting a message requesting a confirmation of capability of providing data corresponding to the identified data type to the one or more external electronic devices using the short-range communication through the communication circuitry;
receiving a response to the message requesting the confirmation of capability of providing the data corresponding to the identified data type from at least one external electronic device;
displaying, on the application screen through the display, information corresponding to the at least one external electronic device capable of providing the data corresponding to the identified data type;
receiving the data corresponding to the identified data type from the at least one external electronic device through communication circuitry; and
entering the received data into the data input field,
wherein the identified data type corresponds to the identified data input field on the application screen of the electronic device.

* * * * *